US006273771B1

(12) United States Patent
Buckley et al.

(10) Patent No.: US 6,273,771 B1
(45) Date of Patent: Aug. 14, 2001

(54) CONTROL SYSTEM FOR A MARINE VESSEL

(75) Inventors: George W. Buckley; Vojislav V. Divljakovic; Phillip K. Gaynor, all of Fond du Lac; Jeffery C. Ehlers, Neenah, all of WI (US); Daniel E. Clarkson, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/528,144

(22) Filed: Mar. 17, 2000

(51) Int. Cl.[7] .......... B60K 41/00
(52) U.S. Cl. .......... 440/84; 114/144 RE
(58) Field of Search .......... 114/144 R, 144 E, 114/146; 440/84; 74/480 B; 701/206, 213

(56) References Cited

U.S. PATENT DOCUMENTS

| | | | |
|---|---|---|---|
| 3,200,782 | 8/1965 | Thomas et al. . | |
| 3,958,524 | 5/1976 | Cantley et al. | 114/146 |
| 4,939,661 | 7/1990 | Barker et al. | 364/521 |
| 5,075,693 | 12/1991 | McMillan et al. | 342/457 |
| 5,467,282 | 11/1995 | Dennis | 364/449 |
| 5,525,081 | 6/1996 | Mardesich et al. | 440/6 |
| 5,592,382 | 1/1997 | Colley | 364/449.1 |
| 5,610,815 | 3/1997 | Gudat et al. | 364/424 |
| 5,751,344 | 5/1998 | Schnee | 348/113 |
| 5,884,213 | 3/1999 | Carlson | 701/206 |
| 5,983,159 | 11/1999 | Schipper | 701/213 |

*Primary Examiner*—Jesus D. Sotelo
(74) *Attorney, Agent, or Firm*—William D. Lanyi

(57) ABSTRACT

A control system for a marine vessel incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

51 Claims, 11 Drawing Sheets

CONTROL SYSTEM FOR A MARINE VESSEL

BACKGROUND OF THE INVENTION

1. Field of the Invention

The present invention is generally related to a control system for a marine vessel and, more particularly, to a control system that utilizes a serial bus to connect pluralities of input devices and output devices in signal communication with each other.

2. Description of the Prior Art

The control of a marine vessel, such as a pleasure craft used for fishing, water skiing, or other leisure activities, requires the implementation of many different input and output devices. For example, input signals are provided by speedometers, tachometers, depth finders, and various temperature and pressure sensors. Engine control units (ECU's) provide output signals to control the operation of various components related to the internal combustion engine of the marine propulsion system used to provide thrust for the marine vessel.

In marine vessels that use transducers as input devices, such as speed sensors, temperature sensors, and pressure sensors, it is typical for each transducer to be separately and individually connected in signal communication with an appropriate gauge located on the control panel at the helm of the vessel. For example, a speed measuring transducer (e.g. paddlewheel) may be connected by a pair of wires to a speedometer gauge on a control panel of the marine vessel. Similarly, a pressure transducer disposed in pressure sensing relation with an oil system or a cooling system would typically be connected by a pair of wires to a separate gauge on a control panel at the helm of the marine vessel. Similarly, temperature transducers and other sensors would be connected to their associated gauges on a control panel. If the marine propulsion system is provided with actuators to cause the propulsion system to trim or tilt relative to the marine vessel, switches would typically be provided at the helm to activate the trim and tilt cylinders and position transducers would be attached to the marine propulsion system and connected, by appropriate wires, to gauges on the control panel to inform the marine vessel operator of the actual position of the marine propulsion system.

In pleasure craft known to those skilled in the art, the various input and output devices are connected individually to associated devices. If many input and output devices are provided on the marine vessel, the number of wires and interconnections can be significant. In addition, during manufacture of the marine vessel, the assembly of the system can be very complex when large numbers of input and output devices are provided.

U.S. Pat. No. 3,958,524, which issued to Cantley et al on May 25, 1976, describes a station control selection system for controlling a motor and rudder of a power boat selectively from either of two remote stations, each of which includes means for producing linear input signals for motor shift and throttle control and for steering control. The system includes a steering input selector mechanism which is capable of transmitting the linear input signal for steering control from one of the stations to the rudder while isolating the signal from the other station. A motor input selector mechanism is capable of transmitting the linear input signals from motor shift and throttle control from one of the stations to the motor while isolating the signals from the other station. The steering and motor input selector mechanism may be actuated to facilitate the selection of one of the stations whenever corresponding linear input signals from the two stations are substantially equal. The system also includes a mechanism for initiating the actuation of selection of one of the stations prior to the corresponding linear input signals from the two stations being substantially equal.

U.S. Pat. No. 3,200,782, which issued to Walden on Aug. 17, 1965, describes a power boat attachment which prevents the tendency to porpoise, to increase speed at a given power and to improve tracking. The purpose of the invention is to provide elevator plates at the stern or transom of a power boat at the water line and to automatically adjust the angle of such elevator plates toward the horizontal by providing a regulator controlling the elevator plates and having cooperating plunger elements urged apart by a spring which yields and permits shortening of the regulator as more pressure is applied to the elevator plates by the water. A further purpose is to spring bias elevator plates located at the water line adjacent to the stern or transom of a power boat so that under low load the elevator plates extend behind the boat at a substantial angle below the horizontal and as load increases the springs yield to permit the elevator plates to assume smaller angles with respect to the horizontal.

U.S. Pat. No. 5,884,213, which issued to Carlson on Mar. 16, 1999, describes a system for controlling navigation of a fishing boat between waypoints representing successive positions around a navigation route. The system includes an input device for setting the waypoint positions, a position detector to detect the actual position of the fishing boat, a trolling motor to produce a thrust to propel the fishing boat, a steering motor to control the direction of the thrust, and a heading detector to detect the actual heading of the fishing boat. The system also includes a control circuit which determines a desired heading using a desired waypoint and the actual position of the fishing boat, and generates a steering control signal applied to the steering boat to steer the fishing boat from the actual position to the desired waypoint. The system operates in various modes which allow repeated navigation of the fishing boat around a navigational route. The system provides for automatic waypoint storage as the fishing boat is maneuvered around a navigation route.

U.S. Pat. No. 5,751,344, which issued to Schnee on May 12, 1998, describes a navigation system for a marine vessel in low light conditions and includes a low light video camera mounted with a weather proof enclosure on a vantage point of a marine vessel for improved night vision. A conventional video cameral is also mounted with the low light video for daytime viewing. Video signals from the cameras are automatically selected depending on light conditions for transmission to a cabin of the vessel. Motors rotate the housing in a horizontal plane and in a vertical plane for enabling remote controlled aiming of the cameras from the helm of the marine vessel. Sensors provide information on azimuth and elevation of the cameras for overlaying the video signal transmitted from the camera housing with this information for display with the video image on a monitor near the helm. Information on longitude and latitude, as well as vessel velocity and direction, from a global satellite positioning system receiver is also displayed. The overlay video signal is radio frequency modulated on to a predetermined channel for distribution to television receivers in other locations of the vessel.

U.S. Pat. No. 5,592,382, which issued to Colley on Jan. 7, 1997, discloses a directional steering and navigation indicator which directs a user toward a desired destination. Position and steering information are integrated into a single display to allow the user to immediately determine whether the correct course is being traveled, and to inform the user of any directional changes which may be necessary to be directed toward the desired destination waypoint. The user's position and course are determined by a navigation system and indicated on the display as a directional pointing icon, such as a line or arrow. The destination is displayed as a point. The user's Point of Closest Approach (PCA) can then be calculated according to current position, course, and the position of the desired destination. As the user's course gets closer to the bearing of the destination waypoint the PCA indicator can correspondingly shift with the user's movements. By superimposing the PCA over the destination waypoint, the user may precisely steer his or her craft to the desired destination.

U.S. Pat. No. 5,075,693, which issued to McMillan et al on Dec. 24, 1991, discloses a primary land arctic navigation system for use in a vehicle which comprises, in combination, a device providing a signal representative of the speed of the vehicle, and a computing apparatus responsive to the vehicle heading representative signal and the vehicle speed representative signal for providing a continuous indication of the position, altitude and heading of the vehicle.

U.S. Pat. No. 4,939,661, which issued to Barker et al on Jul. 3, 1990, describes an apparatus for a video marine navigation plotter with electronic charting and methods for use therein. The apparatus is provided for marine use and various methods for processing navigational data therein and displaying resulting navigational data thereon are provided. Specifically, the plotter stores coastline data only for those cells which contain coastline data within a given geographic region of a predefined chart. The data for each of these cells is stored in a unique data structure that stores data for a plurality of line segments that, when drawn, collectively depicts the geographic data stored within that cell. Each segment is stored in terms of coordinate locations for a starting point followed by coordinate offset values for each successive point in that cell. Only those cells and their constituent segments are drawn for coastline data that exists within a specific region to be displayed. Once a coastline chart is displayed, the inventive plotter permits navigational data to be overlaid thereon and through this capability provides several useful features as set forth in this description of this device.

U.S. Pat. No. 5,525,081, which issued to Mardsich et al on Jun. 11, 1996, discloses a transducer systems for a trolling motor. It comprises a trolling motor, including a microcontroller, a plurality of transducers, a steering motor, and an outboard motor. The user is allowed to input commands via a keyboard and the selected mode of operation is displayed via a LCD screen. The microcontroller operates the transducer to transmit sonar signals and the return signals are received and processed accordingly. In the preferred embodiment, there are five transducers arranged in a manner such that the port and starboard sides as well as the bottom of the boat are scanned continuously. The microcontroller processes the signals according to the user selected mode, determines the steering angle and the motor speed, transmits these values to the steering motor and position controller and the power drive and motor controller. In the preferred embodiment there are three automatic modes of operation: creek-tracking mode, depth-tracking mode, and shore-tracking mode.

Various types of known navigational systems utilize a global positioning system (GPS) which incorporates a plurality of earth orbiting satellites. The global position system (GPS) is a space-based radio navigation system consisting of numerous satellites and ground support stations. GPS provides users with accurate information about their position and velocity, as well as the time, anywhere in the world and in all weather conditions. The GPS, which was formerly known as the NAVASTAR Global Positioning System, was initiated in 1973 and is operated and maintained by the United States Department of Defense. The GPS determines location by computing the difference between the time that a signal is sent and the time that it is received. GPS satellites carry atomic clocks that provide extremely accurate time. The time information is placed in the codes broadcast by the satellites so that a receiver can continuously determine the time the signal was broadcast. The signal contains data that a receiver uses to compute the locations of the satellite and to make other adjustments needed for accurate positioning. The receiver uses the time difference between the time of signal reception and the broadcast time in order to compute the distance, or range, from the receiver to the satellite. With information about the ranges to three satellites and the location of the satellite when the signal was sent, the receiver can compute its own three dimensional position. By taking a measurement from a fourth satellite, the receiver avoids the need for having an atomic clock. Thus the receiver uses four satellites to compute latitude, longitude, altitude and time. GPS comprises three segments: the space segment, the control segment, and the user segment. The space segment includes the satellites which fly in circular order at an altitude of 12,500 miles and with a period of 12 hours. The orbits are tilted to the earth's equator by 55 degrees to ensure coverage of polar regions. Powered by solar cells, the satellites continuously orient themselves to point their solar panels toward the sun and their antennae toward the earth. Each satellite contains four atomic clocks. The control segment includes the master control station at Falcon Air Force Base in Colorado Springs, Colo. and monitor stations at Falcon Air Force Base and on Hawaii, Ascension Island in the Atlantic Ocean, Diego Garcia Atoll in the Indian Ocean and Kwajalein Island in the South Pacific Ocean. The user segment includes the equipment of the military personnel and civilians who receive GPS signals. Military GPS user equipment has been integrated into fighters, bombers, tankers, helicopters, ships, submarines, tanks, jeeps, and soldier equipment. Over 500,000 GPS receivers are in use at the current time. Surveyors use GPS to save time over standard survey methods. GPS is also used by aircraft and ships for en route navigation and for airport and harbor approaches. GPS tracking systems are used to route and monitor delivery vans and emergency vehicles. In a method called precision farming, GPS is used to monitor and control the application of agricultural fertilizer and pesticides. GPS is available as a in-car navigation aid and is used by hikers and hunters.

GPS is available in two basic forms. The standard positioning service (SPS) and the precise positioning service (PPS). SPS provides a horizontal position that is accurate to about 330 feet while PPS is accurate to about 70 feet. Enhanced techniques such as differential GPS (DGPS) and the use of a carrier frequency processing system have been developed for GPS. DGPS employs fixed stations on the earth as well as satellites and provides a horizontal position that is accurate to approximately 10 feet. Surveyors pioneered the use of a carrier frequency processing system to compute positions to within approximately 0.4 inches.

U.S. Pat. No. 5,467,282, which issued to Dennis on Nov. 14, 1995, describes a GPS and satellite navigation system. The system provides improved accuracy and reliability over wide geographical areas, including remote regions. Ranging type signals transmitted through two or more commercial geostationary telecommunication satellites are received at known reference locations where navigation and correction information is generated and transmitted back to remote users. At the same time, the reference stations receive signals from the global positioning system, generate corrections for the GPS measurements, then transmit these corrections to the remote user. The remote user receives all of this information plus direct measurement from both the GPS and the geostationary satellites and, using conditional error processing techniques, provides a position solution whose accuracy and reliability exceeds that of GPS alone. Alternatively, integrated carrier phase data can be substituted for pseudoranges obtained from the geostationary satellite transmissions.

U.S. Pat. No. 5,610,815, which issued to Gudat et al on Mar. 11, 1997, describes an integrated vehicle and navigation system for positioning and navigating an autonomous vehicle which allows the vehicle to travel between locations. Position information is derived from global positioning system satellites or other sources when the satellites are not in the view of the vehicle. Navigation of the vehicle is obtained using the position information, route information, obstacle detection and avoidance data, and on board vehicle data.

U.S. Pat. No. 5,983,159, which issued to Schipper on Nov. 9, 1999, describes a location determination system using signals from fewer than four satellites. The system can operate receiving signals from as few as one satellite, preferably non-geosynchronous. Where signals from two or more satellites are received, one may be geosynchronous. Pseudoranges are measured from one or more satellites at two or more selected, spaced apart observation times, and the simultaneous rotations of the body and the satellites relative to each other result in different body-satellite constellations for which the initial location coordinates of the selected point are determined exactly, without approximation or iteration. The selected point may be motionless or may be allowed to move with known coordinate differences between the initial unknown location and the present location at each observation time. Pseudoranges from different satellites, or even from different satellite systems can be measured and used in this procedure.

U.S. Pat. No. 5,955,973, which issued to Anderson on Sep. 21, 1999, discloses a field navigation system. A location system is used in a vehicle moving within an area at a selected speed and in a selected direction. A heading sensor provides a heading signal representing the direction of movements of the vehicle. A speed sensor provides a speed signal based on available reference signals representing the speed of the vehicle. A storage device stores initial position data representing a selected initial position of the vehicle and checkpoint data representing a navigation checkpoint location. A database stores a plurality of records which each include geographic information data representing selective aspects of the area. A processor estimates a current position signal representing an estimated current position of the vehicle based on values of the heading signal, values of the speed signal, the initial position signal, and on previous values of the current position signal. Values of the current position signal correspond to records stored in the data base. A correction device selectively corrects the current position signal based on selected position inputs which indicate an approximate vehicle position relative to the navigation checkpoint location. An alerting device obtains an alerting signal indicating that the vehicle has reached a selected region within the area based on the current position signal and the geographic information data.

U.S. Pat. No. 3,838,656, which issued to Greene on Oct. 1, 1974, discloses a marine automatic pilot rudder motor control system. The system for controlling the sensitivity of rudder movement on a pleasure boat having an automatic pilot is disclosed. The system includes apparatus for reducing the sensitivity of rudder responsiveness to error signals as wave motion and wind gusts increase.

U.S. Pat. No. 4,344,065, which issued to Erwin et al on Aug. 10, 1982, describes a convergence indicator for marine and flight vehicles. A visual aid for boat skippers to which a skipper inputs information about the relative position of another observed boat and a navigation light color which he observes is provided. The device has a group of input switches, each indicated a possible relative position of the second boat. Another group of switches indicates the possible navigation light colors of red, green, and white. A display signals whether the input combination of position and lights is a potential collision condition. A collision detecting logic circuit connects the switches to a display for actuating the display in response to actuation of selected combinations of the switches.

U.S. Pat. No. 5,390,125, which issued to Sennott et al on Feb. 14, 1995, describes a vehicle position determination system and method. The systems and methods allow for the accurate determination of the terrestrial position of an autonomous vehicle in real time. A first position estimate of the vehicle is derived from satellites of a global positioning system and/or a pseudolite. The pseudolite might be used exclusively when the satellites are not in the view of the vehicle. A second position estimate is derived from an inertial reference unit and/or a vehicle odometer. The first and second position estimates are combined and filtered using novel techniques to derive a more accurate third position estimate of the vehicle's position. Accordingly, accurate autonomous navigation of the vehicle can be effectuated using the third position estimate.

U.S. Pat. No. 5,155,490, which issued to Spradley et al on Oct. 13, 1992, describes a geodetic surveying system using multiple GPS base stations. The improved system and method for determining a position fix in space and time using the global positioning system satellite network signals is provided. The system comprises at least three fixed base stations each having a satellite receiver operating in conjunction with a highly accurate clock. Each base station's position is known with great accuracy. GPS Satellite signals are collected over statistically significant periods of time at each base station and fitted to determine with the clock offset and drift of the station clocks, thus establishing a network of base station clocks that in the aggregate is of great accuracy and precision. An arbitrary number of mobile receiver stations similarly collect date for working periods of statistically significant duration, with these data being used in conjunction with the base station data to compute position fixes for the mobile stations.

U.S. Pat. No. 5,014,206, which issued to Scribner et al on May 7, 1991, describes a tracking system for determining and recording the location of a vehicle during the occurrence of predetermined events. The vehicle is equipped with a sensor or sensors which respond to the occurrence of the predetermined events. The sensors are connected to a navigational system which receive positional information from a navigational transmitter. The navigational system then computes the positional information, such as latitude and longitude of the vehicle, and stores this information in a data collector on the vehicle. The date and time of day of the occurrence of the events may also be stored along with the positional information.

Many different types of chart plotters are commercially available and are well known to those skilled in the art. Various types of GPS plotters are available commercially and are manufactured by the Raytheon Corporation, the Furuno Corporation and others. In addition, many different types of hand-held and permanently fixed GPS receivers are available commercially.

A communication system known as the Controller Area Network (CAN) has been developed by the Bosch Corporation and has been used in many types of automotive and industrial applications. The basic principle of a CAN communication system is that data messages transmitted from any node on a CAN bus do not contain addresses of either the transmitting node or of any intended receiving node. Instead, the content of the message is labeled by an identifier that is unique throughout the network. All other nodes on the network receive the message and each performs an acceptance test on the identifier to determine if the message, and thus its content, is relevant to that particular node. If the message is relevant, it will be processed. Otherwise, it is ignored. A two-wire bus is usually provided and consists of a twisted pair of conductors. CAN is able to operate in extremely harsh environments and its extensive error checking mechanisms ensure that any transmission errors are detected. The National Marine Electronic Association (NMEA) has developed an international standard intended to permit ready and satisfactory communication between electronic marine instruments, navigation equipment, and communications equipment when interconnected via an appropriate system. The interconnection is intended to be by means of a two-conductor, shielded, twisted pair of wires.

U.S. Pat. No. 5,469,150, which issued to Sitte on Nov. 21, 1995, discloses a sensor actuator bus system. A four-wire bus is provided with a two-wire power bus and a two-wire signal bus and a plurality of sensors and actuators attached to both two-wire busses. A modification is provided to the standard CAN protocol developed and provided by Robert Bosch GmbH, in which the standard CAN header, of a data packet, is modified to incorporate a shortened device identifier priority. By shortening the identifier field of the CAN header three bits are made available for use as a short form protocol data unit which can be used to contain binary information representing both the change of status of an identified device and the current status of the device. The same three-bit PDU can be sued to acknowledge receipt of the change of status information. In order to retain all of the beneficial capabilities of the standard CAN protocol, the three-bit short form PDU can also be used to identify the use of additional bytes of a data field so that a device can take advantage of the more complex capabilities of the standard CAN protocol. However, in situations where a mere change of status report is sufficient, the present invention reduces the length of a message from a minimum of three bytes to a length of two bytes to obtain the significant benefits of increased speed of message transmission.

In certain systems, such as large industrial control systems, it may be sufficient to create a control system in which no new devices are expected to be added to the system after its initial design and manufacture. Alternatively, if the original manufacturer of the industrial control system retains control of all additional equipment added to the system, appropriate regulation of the signal exchanges can be retained. However, when one manufacturer originally creates a control system using CAN and other manufacturers add components to the system, without the knowledge of the original manufacturer, the orderly processing of signals and messages maybe compromised by the added components. Kvaser Consultant AB, of Sweden, and inventors Lennartsson and Fredriksson et al in particular have developed a system known to those skilled in the art as the "CAN Kingdom". The Can Kingdom system addresses several problems inherent in a standard controller area network system (CAN) when used in circumstances in which subsequent suppliers and users provide components that are later connected to an existing controller area network system and which are not under the control of the original manufacturer and supplier of the system.

U.S. Pat. No. 5,383,116, which issued to Lennartsson on Jan. 17, 1995, describes a device for controlling a member in a system. The apparatus or manufacturing system in which a first member executes a desired function or action which is controllable as a function of at least one parameter characteristic for a second member is provided by this system. A first detector detects signals corresponding to values of the at least one parameter of the second member. At least one transmitter receives the detected signals and assigns coded/numbered messages for each value of the parameter. The apparatus further includes at least one receiver with a control module for controlling the desired action of the first member. The signal transmission between the transmitter and the receiver occurs over a connection bus and the signals are transmitted in the form of the coded/numbered messages in a predetermined order, with well defined transmission times between the first detector and the transmitter and between the transmitter and the receiver. A control unit controls operation of the receiver module and sends thereto at least information regarding a desired parameter value at which a corresponding desired function or action is to be executed by the first member, or a desired message number to be selected. The receiver obtains the requested desired message number or, based on the desired parameter value and the time information for the desired action or function of the first member selects itself and receives a corresponding message number containing the parameter value. Based on the message number, the receiver generates an activation signal for the first member.

U.S. Pat. No. 5,446,846, which issued to Lennartson on Aug. 29, 1995, describes a distributed computer system arrangement. The system of interconnected module units which perform logical operations at different locations are included in the arrangement. A serial data bus interconnects all of the modules units through a connecting device which enables the module to communicate over the serial bus. The connecting device includes a memory device having stored therein identification information to identify the module unit to other module units communicating over the bus. A logic circuit which is connected to the memory device transfers the information from a memory to the module unit during an initialization phase of the system. The module units are thereafter able to communicate over the serial data bus. The connecting device has first and second sets of connectors for mating with corresponding connectors on the serial bus and the module units. Thus each module need not know where it is being connected along the serial bus, as all information for communicating over the bus is provided by the connecting device.

U.S. Pat. No. 5,696,911, which issued to Fredriksson on Dec. 9, 1997, describes an arrangement for eliminating malfunction and/or permitting high speed transmission in a serial bus connection, and transmitter and receiver units linked to the latter. The system includes a bus connection and transmitter and receiver units linked to this bus connection. The connection is digital and can assume one of two signal states, zero and one. Each unit assumes listening and transmitting positions and operates with an access function to the bus. Only designated or selected units can be activated so as to be able to transmit dominant signals or pulses, in this case zeroes. Said designated or selected units are located at a distance from each other which is substantially shorter than the total length of the connection. Dominant signals which can be assigned to the acknowledgement function in the system are emitted only by the selected or designated units. Other units are prevented from transmitting the respective dominant signal and assume only a listening position on the bus condition.

All of the patents described above are hereby explicitly incorporated by reference in the description of the present invention.

Many different types of input devices and output devices are available for use on a marine vessel and are well known to those skilled in the art. These devices include depth finders, fish finders, chart plotters, receivers, auto pilot systems, instrumentation gauges and annunciators, GPS receivers, and other navigational aids. These devices are individually well known to those skilled in the art and will not be individually described in detail herein. These input and output devices are available commercially from the Raytheon Corporation, the Motorola Corporation, and many other corporations.

Although each of the input and output devices described above are commercially available for use in conjunction with the control of marine vessels, it would be significantly beneficial if a communication system could be provided which allows all of the input and output devices to be conveniently and efficiently connected to a common serial bus in a way that allows a central controller to maintain control over all of the input and output devices and regulate the signal traffic on the serial bus. It would further be significantly advantageous if the serial bus could be configured in a way that allows additional components to be added subsequent to the original manufacture of the control system without adversely affecting the orderly operation of the control system. Of particular benefit would be the ability for a central controller to acknowledge and accept, or reject, the addition of input and output devices following the initial manufacture of the control system in conjunction with the marine vessel.

SUMMARY OF THE INVENTION

A marine vessel control system made in accordance with the present invention comprises a marine propulsion system attached to the marine vessel. The propulsion system can comprise one or more outboard motors, jet drives, a sterndrive system, or an inboard propulsion system. The specific type of propulsion system used on the marine vessel is not limiting to the present invention. The control system further comprises a communication bus which, in a particularly preferred embodiment of the present invention, is a serial communication bus on which all messages relating to the control of the marine vessel and its various systems are transmitted. The system further comprises a controller that is connected in signal communication with the communication bus. The controller can be a microprocessor associated directly with the marine propulsion system or, alternatively, can be a centrally located microprocessor or a plurality of microprocessors associated in signal communication with each other for control of the marine vessel. A preferred embodiment of the present invention further comprises a plurality of devices connected in signal communication with the communication bus. The plurality of devices comprises input devices and output devices. The input devices provide signals to the controller which are representative of various parameters detected and measured by the input devices. The output devices comprise various actuators that respond to commands from the controller to maintain or change certain physical conditions relating to the marine vessel. These output devices can be pumps, stepper motors associated with the engine's throttle plate, hydraulic cylinders or electric servo motors associated with trim tabs or with the propulsion system to change the trim and tilt of the system, hydraulic actuators used to change the position of the marine propulsion system relative to the marine vessel to affect steering, or any other output device necessary to control the operation of the marine vessel or its various systems.

A preferred embodiment of the present invention further comprises a bus access manager that is connected in signal communication with the controller to regulate the incorporation of additional devices to the plurality of devices in signal communication with the communication bus. In a particularly preferred embodiment of the present invention, the bus access manager comprises software of the type that includes, inter alia, a CAN Kingdom network. The function of the bus access manager is to make sure that all devices connected to the communication bus are properly connected and deemed acceptable to the controller. The bus access manager plays a very important role in the present invention by allowing a preconfigured marine vessel control system to be modified through the addition of other components subsequent to the original manufacture and configuration of the marine control system. In other words, if an original manufacturer creates a marine vessel control system and that system is installed on a marine vessel, the use of a bus access manager as part of the marine vessel control system allows the boat builder, or subsequent boat owner, to add components in signal communication with the communication bus which were not part of the originally configured system. This advantageous feature of the present invention provides the flexibility that allows subsequent owners and operators of the marine vessel control system to modify the marine vessel through the addition of input devices and output devices that were not part of the originally configured control system without compromising the original system.

In a marine vessel control system made in accordance with the present invention, the controller is effectively connected in signal communication with each of the plurality of devices, both input devices and output devices, that are connected to the communication bus. In other words, although the controller is not directly connected physically to each of the input devices and output devices individually, the common connection of all the devices and the controller to the communication bus provides the necessary signal communication between the devices and the controller.

The plurality of devices connected to the communication bus can, for example, comprise a steering transducer and a steering actuator. The steering transducer can be connected to a manually actuated steering mechanism (e.g. a steering wheel) to provide a steering signal on the communication bus which is representative of a physical position of the manually actuated steering mechanism. The steering actuator is attached to the marine propulsion system for changing the position of the marine propulsion system relative to the marine vessel. The steering actuator receives the steering signal from the communication bus. In other words, when a marine vessel operator turns the steering wheel at the helm, a transducer detects the angular position of the steering wheel and the signal is conditioned by a secondary controller which provides a signal on the communication bus which represents that angular position of the steering wheel. This is the steering signal which is received by a steering actuator, such as a hydraulic motor, an electric motor, or a system of hydraulic actuators. The steering actuator responds to the signal received from the communication bus and causes the marine propulsion system to move for the purpose of effecting the desired steering position represented by the position of the steering wheel. In effect, this embodiment of the present invention results in a "steer-by-wire" system, in which there is no direct physical connection between the steering wheel and the marine propulsion system, such as an outboard motor or sterndrive system. Rather than using cables or linkages, as are well known to those skilled in the art, the present invention provides signals that are transmitted from the helm by a steering transducer and received at the marine propulsion system by a steering actuator.

The plurality of devices can further comprise a manually actuated thrust control mechanism, such as a throttle control lever, and an engine controller, such as a engine control unit (ECU) which are both connected in signal communication with the communication bus. The engine controller controls the factors which affect engine speeds and loads. The engine is connected in torque transmission relation with the marine propulsion system. In other words, the vessel operator can manually move a throttle lever, at the helm, which provides a signal on the communication bus to the engine control unit, which, in response to receiving the signal from the communication bus, changes the status of components which affect speed and load. For example, this can be accomplished through the use of a simple stepper motor attached to a throttle plate in a carbureted engine or by changing the fuel per cycle (FPC) provided to each cylinder in a fuel injected system. In either system, the manual movement of a throttle lever by the marine vessel operator creates a signal on the communication bus that is responded to by an engine control unit and, as a result, the operating speed and load of the engine is changed.

The plurality of devices can further comprise a course controller which is connected in signal communication with the communication bus. The course controller can receive a manually entered destination position, such as a location identified by longitude and latitude. The plurality of devices can further comprise a global positioning system (GPS) that is connected in signal communication with the communication bus and has an output to the bus which is a signal which is representative of the current position of the marine vessel, as represented by longitude and latitude. The course controller can be configured to determine a course from the current position to the destination position. All of the signals connecting the course controller, the global positioning system, the steering control system, and the thrust control mechanism of the marine vessel are connected in signal communication with the communication bus. These devices, like all the other input and output devices associated with the present invention, communicate with each other by transmitting signals on the communication bus according to a preselected protocol. In a particularly preferred embodiment of the present invention, the preselected protocol conforms with the Controller Area Network (CAN). The prioritization and interpretation of the various signals received by the plurality of devices on the communication bus are regulated by the bus access manager which, in a particularly preferred embodiment of the present invention, comprises a CAN Kingdom network.

The plurality of input devices connected to the communication bus can comprise a global positioning system (GPS), a weather information source, pitch and yaw sensors, wind speed sensors, light sensors, an internet source, various manual inputs such as switches and levers, a speedometer, a fluid level sensor for sensing the fluid level of fuel and lubrication, motion sensors, smoke detectors, depth sensors, heat sensors, target acquisition radar systems, and a chart plotter. Other input devices capable of providing a signal that is representative of a monitored parameter can also be connected to the communication bus. Individual sensors can alternatively be connected as inputs to one or more microprocessors which, in turn, are connected to the communication bus. In this way, the intermediate microprocessors can receive data from the individual sensors and reformulate the date prior to transmitting the reformulated data to the communication bus for eventual receipt by a primary controller which is connected to the communication bus. Output devices connected in signal communication with the communication bus can comprise a propeller blade pitch control mechanism, running lights, a speed control mechanism such as throttle plate control systems and fuel per cycle control systems, trim tabs, climate control systems, steering mechanisms, lighting fixtures, drive trim mechanisms, and a transmission gear selecting mechanism. Other output devices can also be connected in signal communication with the communication bus, either directly or through an intermediate microcontroller.

The present invention provides a method of operating a communication system of a marine vessel that comprises the steps of providing a marine propulsion system attached to the marine vessel and a communication bus. It also comprises the step of connecting a controller in signal communication with the communication bus and connecting a plurality of both input devices and output devices, in signal communication with the communication bus. It comprises the step of regulating the incorporation of additional devices to the plurality of devices in signal communication with the communication bus. It further comprises the transmitting of steering command signals on the communication bus from a first one of the plurality of devices which is a manually actuated steering mechanism to a second one of the plurality of devices which is a steering actuator attached to the marine propulsion system. Similarly, it can comprise the steps of transmitting thrust command signals on the communication bus from another one of the plurality of devices which is a manually actuated throttle command mechanism, to an engine control unit that sends a signal to one of the plurality of devices which can be a fuel per cycle controller attached to the engine of the marine propulsion system.

It should be understood that the utilization of a bus access manager in association with the controller of the marine vessel control system provides a significant advantage for the marine vessel control system that allows for the proper control of all of the devices connected to the communication bus even when one of the devices has been subsequently added to the communication bus after the original configuration of the system. The use of a bus access manager, such as a CAN Kingdom network, allows the controller to effectively police the interaction of the devices that are connected to the communication bus. If a new device is added to the communication bus subsequent to the original configuration of the system, and that new device follows prescribed rules and protocols, the control system can incorporate that new device into the marine vessel control system in an effective and efficient manner. The marine vessel control system could not be able to operate effectively with newly added input and output devices without the inclusion of a bus access manager, such as the CAN Kingdom network. The mere use of a controller area network (CAN) system on a marine vessel, without some type of bus access manager, could create chaos and adversely affect the operation of the other input and output devices when a new device is subsequently connected to the bus.

As will be described in greater detail below, the present invention provides a marine vessel control system that allows smart sensors to communicate directly to a primary controller on a serial communication bus, allows more basic sensors and actuators to communicate, through a secondary controller or microprocessor, with the communication bus and to a primary controller, and ensures that the integrity of the original input and output devices are not compromised. The use of intelligent software in both the primary and secondary controllers, receives the various inputs and makes the appropriate decisions necessary to control the operation of the vessel and to display the status of various devices on the vessel. These basic principles of the present invention are used to simplify the operation of the marine vessel.

The simplification of the marine vessel operation can include maneuvering the vessel in close proximity to piers and docks, safely and efficiently moving the marine vessel from one location to another, accurately communicating all vessel system status conditions to the operator of the marine vessel, and determining the appropriate course of action that should be taken based on certain problem conditions. The present invention also communicates critical issues and the location of problems to the appropriate personnel on the marine vessel along with diagnostic information. It allows the marine vessel to be remotely prepared for operation and increases the robustness of the control system during certain panic maneuvers.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
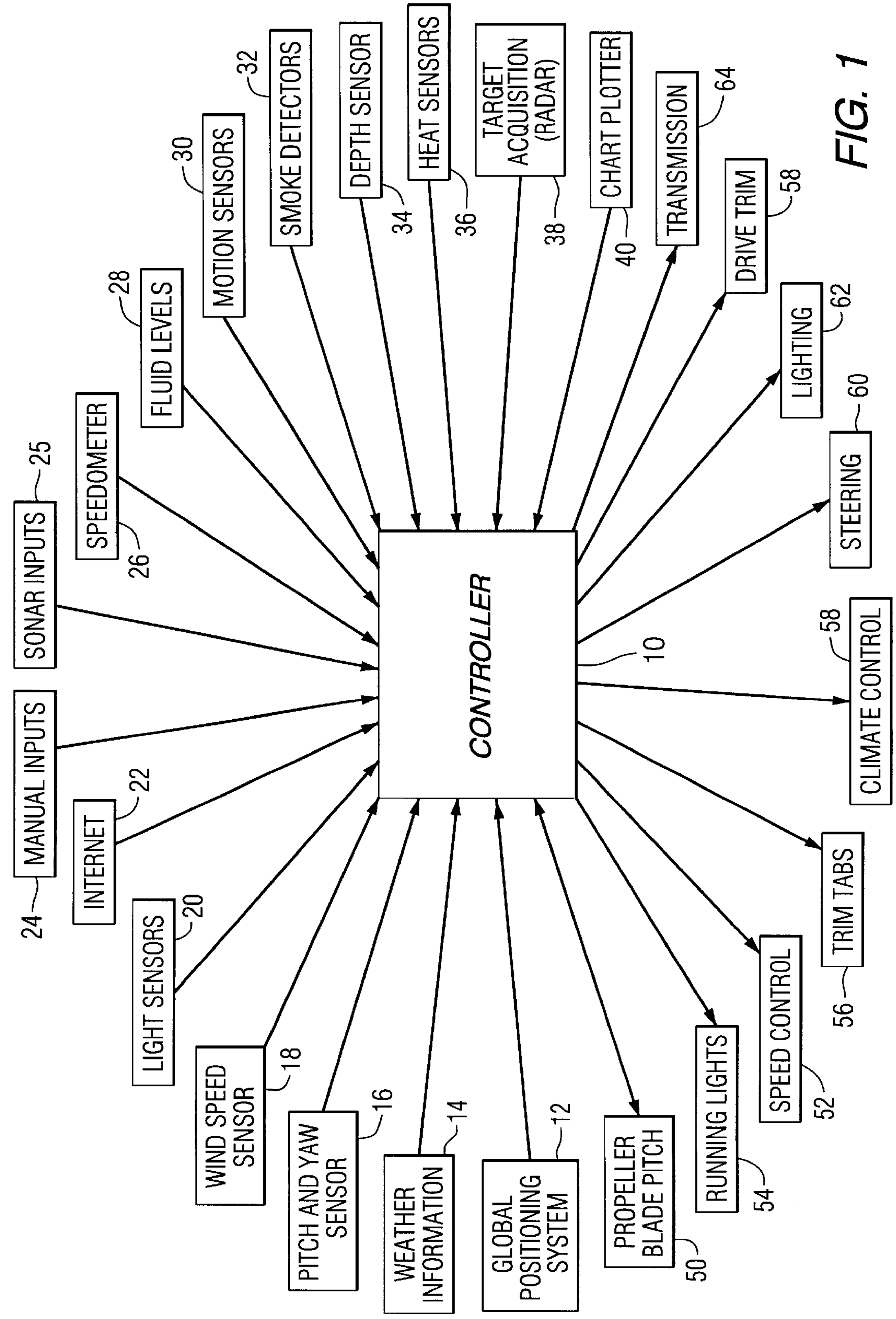
FIG. 1 shows a plurality of input devices and output devices exchanging information with a controller.

Throughout the description of the preferred embodiment of the present invention, like components will be identified by like reference numerals.

FIG. 1 is a schematic representation showing how a plurality of input devices can be used to provide signals to a controller, such as an engine control unit (ECU) and how the engine control unit can provide output signals to a plurality of output devices. Typically, the controller 10 comprises a microprocessor that receives signals from the various input devices. For example, the controller 10 can receive position signals from the global positioning system (GPS) 12 in the form of longitude and latitude positions. Weather information 14 can be received in the form of warnings and coded weather status signals. Pitch and yaw sensors 16 can provide signals to the controller 10 that are representative of the physical position and attitude of the marine vessel, in terms of pitch and yaw, relative to a reference plane. A wind speed sensor 18 can provide information regarding the wind speed in the vicinity of the marine vessel. Light sensors 20 can be used to provide signals to the controller 10 that are representative of the degree of light present in a preselected location. By being connected to the internet 22, the controller can receive signals relating to messages intended to be received by the marine vessel or other types of data requested by the controller 10. The manual inputs 24 can comprise various switches, levers, and other manual input devices that allow a marine vessel operator to communicate with the controller 10. Sensor inputs 25 can provide information relating to either depth of water, locations of shoals or reefs, or the presence of underwater objects. The speedometer 26, fluid level sensors 28, motion sensors 30, and smoke detectors 32 can all provide signals to the controller 10 that relate to various conditions being monitored on the marine vessel. A depth sensor 34 provides an input signal to the controller 10 relating to the depth of water directly under the marine vessel. Sensors 36, such as heat sensors, can monitor certain parameters, such as temperature, of the engine and its various fluids. Target acquisition systems 38, such as a radar system, can be used to determine whether or not another vessel or structure is in the vicinity of the marine vessel. This can then be communicated to the controller 10 as an input signal. A chart plotter 40 can provide signals to the controller 10 that relate to the geographical position of the marine vessel with respect to various shorelines, buoys, and other features relating to the navigation of the marine vessel.

With continued reference to FIG. 1, the controller 10 can provide output signals to many output devices on the marine vessel. For example, the controller 10 can provide signals to change the propeller blade pitch 50 if the marine vessel is provided with a controllable pitch propeller. In a typical application, the controller 10 would receive the signal from a manually controlled thrust demand lever and provide signals to a propeller blade pitch control system 50 in conjunction with a speed control mechanism 52, such as a throttle controller of a carbureted engine or fueling controller of a fuel injected system. The controller 10 can also change the status of running lights 54 in response to signals from the light sensors 20. The trim tabs 56 and the drive trim 58 are changed in response to output signals from the controller based on manual input signals received from the operator of the vessel in conjunction with pitch and yaw sensors 16, speedometer signals 26 and other manual inputs. The climate control system 58 can be regulated by the controller 10 with output signals that are determined as a function of manual inputs 24 and various temperature measurement devices on the marine vessel. The steering control 60 is changed by the controller 10 in response to either manual inputs 24, such as movement of the steering wheel, or signals provided by the global positioning system 12, chart plotter 40 and target acquisition system 38. The lighting 62 of the marine vessel can be changed in response to manual inputs 24 or light sensors 20, depending on the desires of the marine vessel operator. Similarly, if the marine vessel is provided with a transmission 64, the controller 10 can change the gear setting of the transmission based on manual inputs 24, such a thrust demand lever, and the speedometer 26.

Although FIG. 1 shows a plurality of inputs and a plurality of outputs relating to the controller 10, it should be understood that FIG. 1 is not intended as an all inclusive display of inputs and outputs. Many other devices can be provided on a marine vessel and connected in signal communication with the controller 10. In marine control systems known to those skilled in the art, the input devices are typically connected to the controller 10 with individual pairs of wires. Similarly, the output devices are also individually connected to the controller 10 with no direct communication link between individual input devices with other input devices or with the output devices. In other words, all signals from the input devices are wired directly to the controller and all signals from the controller to the output devices are wired directly between those output devices. In a complex marine vessel with many input devices and many output devices, the wiring system can become significantly complex. If any input devices or output devices are subsequently added to the marine vessel, those new devices must be wired directly to the controller 10 and, in a typical application, the controller 10 must be reprogrammed to accommodate the signals received from the input devices and the signals provided to the output devices.

Figure 2:
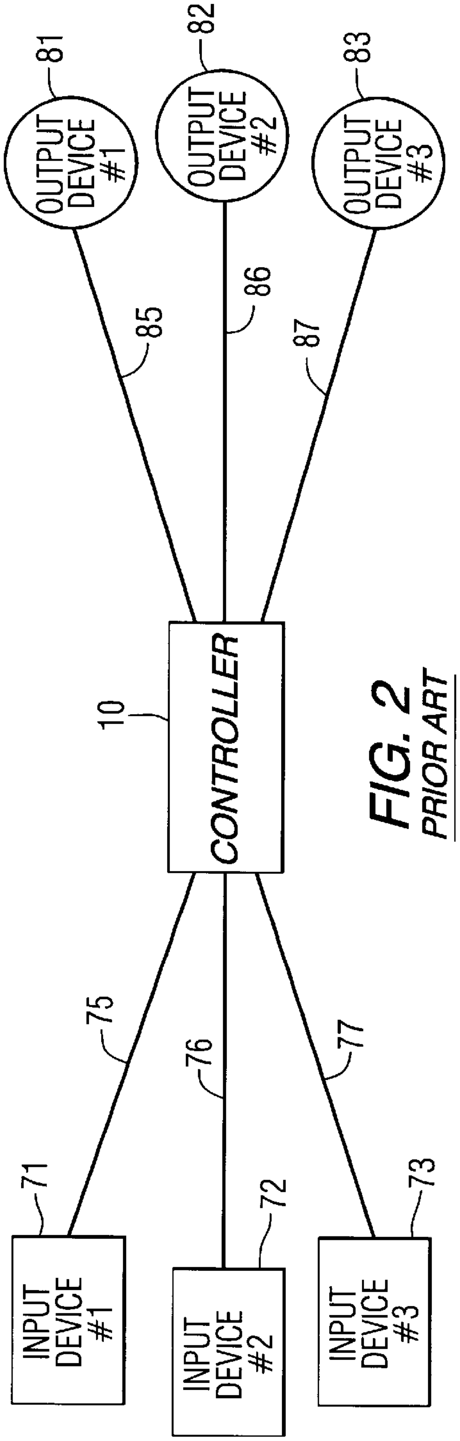
FIG. 2 PRIOR ART
FIG. 2 is a schematic representation of a plurality of input devices and output devices connected to a controller.
Figure 3:
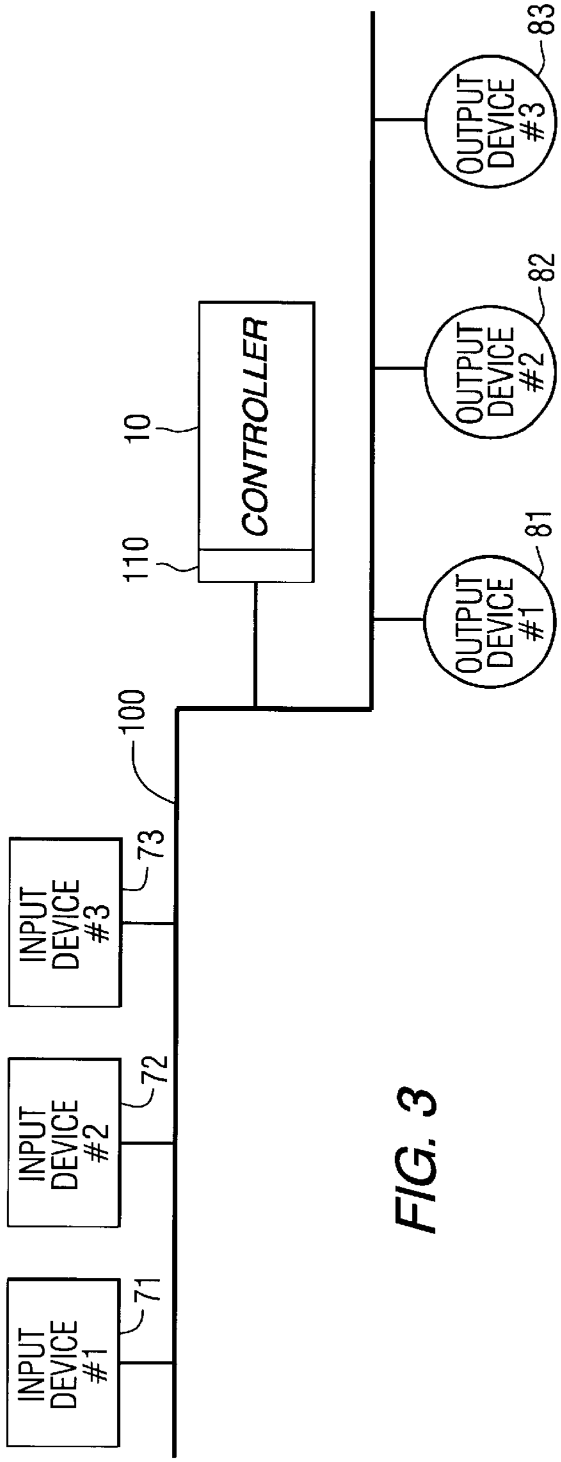
FIG. 3 shows a serial communication bus with a plurality of input and output devices connected directly to the bus along with a controller that is provided with a bus access manager.

FIGS. 2 and 3 illustrate one advantage of the present invention. FIG. 2 is a simplified illustration showing the controller 10 with three exemplary input devices, 71–73, and three exemplary output devices, 81–83. FIG. 2 shows how a typical system on a marine vessel is interconnected. The controller 10 is connected to the first input device 71 by one or more individual wires 75. Similarly, the controller 10 is connected to the second input device 72 by a separate individual set of one or more wires 76. Another set of wires 77 is used to connect the controller 10 to the third input device 73. The controller 10 is connected to the first, second, and third output devices, 81–83, by individual sets of wires 85, 86, and 87, respectively. In this type of application, the three input devices are not directly connected to each other or to the output devices. Similarly, the output devices are each individually connected to the controller 10. Several disadvantages are inherent with a system such as that schematically shown in FIG. 2. First, a significant number of wires must be connected between the controller 10 and the various input and output devices. Furthermore, without some means to regulate the timing of the input signals to the controller 10, conflicts can occur as the controller 10 receives signals from a plurality of inputs and the output devices might not be served in a timely manner because the controller 10 is busy monitoring input signals from the input devices. In a system like that shown in FIG. 2, the controller requires many input and output ports to accommodate the devices connected to it. Another potential disadvantage of the system shown in FIG. 2 is that additional input devices or output devices added after the initial configuration of the system may require further programming of the microprocessor of the controller 10.

In order to address the general problem illustrated in FIG. 2, the controller area network (CAN) has been developed. The CAN system allows a two-wire bus, which is usually a twisted pair of wires, to be used with multiple input and output devices. Data messages are transmitted to any node or device on a CAN bus and do not contain addresses of either the transmitting node or the intended receiving node. Instead, the content of the message is labeled by an identifier that is unique throughout the network. All other nodes on the network receive the message and each performs an acceptance test on the identifier to determine if the message, and thus its content is relevant to that particular node. If the message is relevant, it will be processed. Otherwise, the message is ignored. The unique identifier also determines the priority of the message. The lower the numerical value of the identifier, the higher the priority of the message. The higher priority message is guaranteed to gain access to the serial communication bus as if it were the only message being transmitted at that time. Lower priority messages are automatically retransmitted in the next bus cycle, or in a subsequent bus cycle if there are still other higher priority messages waiting to be sent. The CAN system uses a non return to zero (NRZ) encoding system for data communication on a differential two-wire bus. The use of NRZ encoding ensures compact messages with a minimum number of transitions and high resolution to external disturbance. The CAN bus can operate in extremely harsh environments and the extensive error checking mechanisms ensure that any transmission errors are detected. Controller area network (CAN) systems have been used for many years and are well known to those skilled in the art. The system, which was originally developed by Robert Bosch GmH, has been implemented in many industrial control applications, as described in U.S. Pat. No. 5,469,150 which is discussed above. The basic protocol of the CAN system can be used to accomplish many different purposes and is effective in avoiding interference between the signal from one device and a signal from another device. The arbitration system provided with the CAN network naturally avoids these types of interference between messages.

FIG. 3 shows a system with a controller 10, input devices 71–73, and output devices 81–83, connected to a common communication bus 100. Rather than having each input and output device individually connected to the controller 10, as described above in conjunction with FIG. 2, a controller area network provides the serial bus 100 and allows each of the devices to be connected directly to the serial bus 100. By transmitting messages to the serial bus 100, the controller 10 can communicate with any of the input or output devices. Similarly, the controller 10 can provide command output signals to the output devices 81–83 to cause them to perform desired actions. Through the use of a controller area network (CAN) the amount of interconnecting wires between the input devices, output devices, and controller 10 is significantly reduced. In addition, since the controller area network (CAN) provides an arbitration scheme that effectively eliminates collisions or interferences between message packets from the input and output devices, the problem inherent in the system shown in FIG. 2 and discussed above is eliminated. However, notwithstanding the significant advantages provided by a controller area network (CAN), one problem remains that heretofore provided an obstacle to the extensive implementation of the controller area network (CAN) to certain applications, such as marine vessels.

In most applications where systems such as that shown in FIG. 3 are used, the control system remains under the control of the party who originally configured the system or a subsequent party who owns or operates the system and is capable of altering the software in the controller when the overall system is changed. In other words, if a fourth input device is added to the system shown in FIG. 3, the party in control of the system must be able to make the necessary changes to other input or output devices and to the controller 10 to accommodate the addition of the new input device. For example, the system of the type shown in FIG. 3 may be originally manufactured and configured by a control systems supplier and sold to an industrial facility that then owns and operates the system. If the new device is added to the system, the owner must be capable of taking the required steps to either make the software changes in the controller 10 or arrange for the original manufacturer to make the necessary changes. In certain circumstances, these changes are relatively simple, but require some method for assuring that the necessary components of the system are aware of the addition of the new input device and are able to handle signals received from the input device. In addition, it is necessary that the new input device be properly configured so that it can communicate with the other components of the system in a proper protocol that conforms to the protocol of the controller area network (CAN). If these steps are not taken, the introduction of a new input device connected to the bus 100 will not operate effectively and efficiently. These precautions are well within the capability of the original equipment manufacturer and, in most cases, the owner and operator of the system if the control system is intended for use as an industrial control system in a factory or other manufacturing facility. In circumstances of this type, ownership and control of the system does not frequently change hands and, typically the original manufacturer of the industrial control system is able to assist the subsequent owner or operator with the necessary changes when a new input or output is added to the system. This is also true if the controller area network (CAN) is implemented on an automobile. The original automobile manufacturer has complete control of the components included in the automobile prior to its sale to a consumer. As such, the original manufacturer can appropriately select the component manufacturers for the various elements of the automobile, such as the locks, gear shifts mechanisms, windshield wipers, turn signals, radio and/or tape and compact disc systems, light switches and other switches on the dash board, the head lights, and all other components of the automobile that may interact with a central controller if a controller area network CAN) is used. There is no need for the original equipment manufacturer (e.g. General Motors, Ford, or other automobile manufacturer) to allow for the additional inclusion of a component in the automobile and connected in signal communication with the controller area network (CAN). As a result, there is no need for the original equipment manufacturer to be concerned whether or not additional equipment satisfies the protocols of the controller area network (CAN).

In certain potential applications of a controller area network (CAN), such as in pleasure boats, the original equipment manufacturer of the marine propulsion system does not retain control of the marine vessel control system. In addition, if the marine propulsion system is sold to a boat manufacturer, the boat manufacturer does not retain control of the system after it is sold to a consumer. The eventual owner of the marine vessel may never have subsequent communication with either the original manufacturer of the marine propulsion system or the manufacturer of the boat. Furthermore, if an intermediate system coordinator is involved in the outfitting of the boat, that intermediate party may purchase the control system from the manufacturer of the marine propulsion system and then modify the control system by adding various input devices and output devices prior to the installation and configuration of the system on a marine vessel. Any of the parties subsequent to the original manufacturer may alter the system by adding or removing input and output devices. The use of a traditional controller area network (CAN), as described above, is not particularly suitable for use in systems, such as pleasure boats, where various parties can modify the control system subsequent to the initial configuration of the control system. It is therefore beneficial if some means can be provided to allow subsequent parties to add or delete components from the controller area network (CAN) system after its initial configuration. In FIG. 3, a bus access manager 110 is shown schematically as a portion of the controller 10. The bus access manager, in a particularly preferred embodiment of the present invention, is a software system such as that which is provided by the CAN Kingdom system developed and provided by Kvaser Consultants AB of Sweden. The bus access manager operates to police the bus 100 and assure that all of the devices, whether input devices or output devices connected to the bus 100 are legitimate and are acceptable to the controller 10. When initiated, the bus access manager, 110 interrogates all of the devices on the bus 100 to determine their identity and legitimacy as elements of the control system. If any of the devices is not determined to be legitimate by the bus access manager 110, all signals emanating from that device will be ignored by the controller 10 and all other input and output devices connected to the bus 100. This will occur even if the illegitimate device attempts to transmit signals on the bus 100 in a generally acceptable controller area network (CAN) protocol. The bus access manager acts as a "King" within the CAN Kingdom and determines the priorities of all the other devices connected to the bus 100. The presence of the bus access manager assures that all signals on the serial bus 100 will be of the proper protocol and the bus access manager will maintain order as the various devices transmit signals on the bus. The bus access manager will avoid the chaos that would otherwise result from unrecognized input or output devices transmitting signals to the bus in a manner that is not acceptable to the bus access manager.

Figure 4:
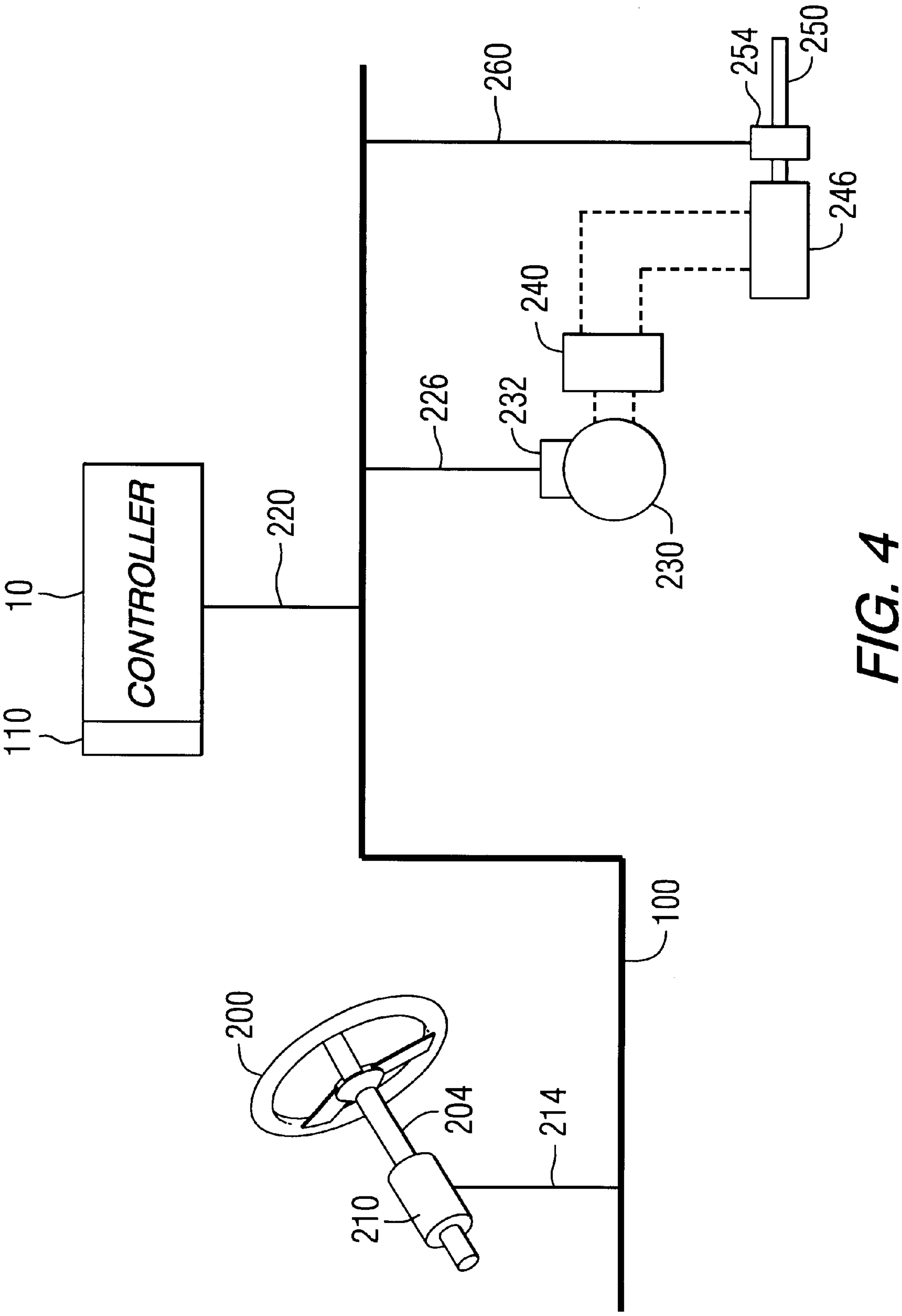
FIG. 4 shows one particular use of a serial communication bus in conjunction with a manually controlled steering mechanism and a steering actuator.

FIG. 4 is intended to show one particular combination of an input device and an output device and how they operate within a control system made in accordance with the present invention. In a highly simplified schematic illustration, FIG. 4 shows a manually controllable steering mechanism 200 which, in this example, is a steering wheel. The steering wheel is attached to a shaft 204 which rotates with the steering wheel. The angular position of the shaft 204 is sensed by a transducer 210 which provides a signal on line 214 to the serial bus 100. The signal transmitted to the bus 100 conforms with a controller area network (CAN) protocol which is generally known to those skilled in the art and publicly available for study and analysis. The steering signal transmitted to the bus 100 is received by the controller 10 on line 220. If necessary, the controller 10 interrogates the steering signal to determine whether it is within acceptable limits. Additionally, the controller 10 can check other inputs, such as alarm signals, vessel speed indicators, and other signals that may affect the steering system. A subsequent signal, formatted to conform to the controller area network (CAN) protocol, is transmitted on line 220 to the serial bus 100. That signal is then received from the bus, on line 226, by a smart device such as a pump 230 with a local controller 232. It should be understood that a preferred embodiment of the present invention incorporates input devices and output devices that are considered to be smart devices. In other words, the input devices and output devices are typically provided with internal intelligence, such as a microprocessor. The microprocessor located in the receiver 232 of the pump 230 will receive the signals on line 226 and cause the pump 230 to take an action commanded by those signals. In a preferred embodiment of the present invention, each of the input and output devices would be provided with a controller area network (CAN) circuit which is commercially available from various sources such as, but not limited to, the Motorola Corporation. The receiver 232 could turn the pump 230 on or off, as commanded, and control a valve 240 that directs pressurized hydraulic fluid to one side of a piston within a cylinder 246 and allows return flow of fluid from the other side of the piston back to a reservoir associated with the pump 230. In this way, the receiver 232 would control the movement of a shaft 250 of the cylinder 246. By moving the shaft into or out of the cylinder 246, toward the left or right in FIG. 4, a steering mechanism can be controlled. The shaft 250 would be connected, by appropriate linkages, to a marine propulsion device to cause it to move relative to the transom of a marine vessel. A position sensor 254, such as a LVDT, could be associated with the shaft 250 to provide a signal on line 260 to the serial bus 100. The signal provided on line 260 by the sensor 254 would represent the axial position of the shaft 250. That signal would be received on line 220 by the controller 10 to determine whether or not the shaft 250 was at an appropriate position that had been commanded by the signals on line 214 which, in turn, represented the rotational position of shaft 204 and steering wheel 200. In the extremely simplified example shown in FIG. 4, it can be seen that the position of the steering wheel 200 can be used to command the position of shaft 250. As a result, a "drive-by-wire" system can be provided wherein there is no direct mechanical connection between the steering wheel 200 and the marine propulsion device, which can be an outboard motor, a sterndrive system, or the rudder of an inboard drive system. None of the devices shown in FIG. 4, including the steering mechanism transducer 210, the controller 10, the receiver 232, or the position transducer 254 are connected directly to each other. Instead, they are all connected to the serial bus 100 and they all send and receive signals to and from the bus 100. It should be understood that in some systems, the signals transmitted on line 214 from the shaft position transducer 210 can be addressed directly to the receiver 232 to be received from the bus 100 on line 226.

Although not applicable in use for every possible device connected to the bus 100, simple relationships can bypass the controller 10 and transmit signals directly from an input device to an output device. A typical example of this simplified direct communication system could be the relationship between a light switch and a lamp. If a light switch is turned on by an operator, a signal can be placed on the serial bus 100 that is intended for receipt directly by a smart light fixture that responds directly to that signal transmitted on the bus by the light switch. Although not applicable in every instance, this type of direct communication between one device on the bus and another device on the bus, without the intermediate involvement of the controller 10, is possible in certain simplified circumstances.

Although FIGS. 3 and 4 are highly simplified, it should be understood that all of the input and output devices described above in conjunction with FIG. 1 could be included in a more complex system than that shown in FIG. 4. Rather than simply connecting a steering mechanism and a hydraulic cylinder mechanism to the bus 100, as illustrated in FIG. 4, all of the input devices and all of the output devices described in conjunction with FIG. 1 could be connected directly with the serial bus 100 shown in FIG. 4. The controller 10 would also be connected directly to the bus 100 and all of the signals provided by the devices shown in FIG. 1 would be transmitted by those individual devices directly to the bus 100 for receipt by either the controller 10 or other devices connected to the bus. A marine vessel control system made in accordance with the present invention provides a system that seamlessly integrates all of the marine vessels propulsion, navigation, trimming, docking, and maintenance functions through the utilization of a controller area network (CAN). The present invention allows the integration of propulsion subsystems, navigation specific devices, or subsystems such as global positioning systems (GPS), chart plotters, radar, forward looking sonar, auto-pilot systems, etc., communication systems such as cellular and satellite systems, and maintenance specific subsystems such as diagnostic tools, self-diagnostic intelligent systems, and so on. It will also accept mapping and display systems, gauges and similar items that communicate visual information to the operator of a marine vessel. By integrating all of these functions and adding certain other functions, the system offers additional benefits that can not be found in fragmented applications of the same technologies. The system is capable of application to many types of internal combustion engines in sterndrive, jet drive, outboard, and inboard marine propulsion systems.

Current propulsion systems marketed for small marine vessels and powered by marine engines below 1000 horsepower are typically disjointed and fragmented in terms of integrating all of the engine, drive, and vessel specific functions into the system that can provide the full benefit of such integration. Typically, throttle control, shifting control, and steering control, are individual and separate systems that are not directly related to each other in marine vessels known in the prior art.

Figure 5:
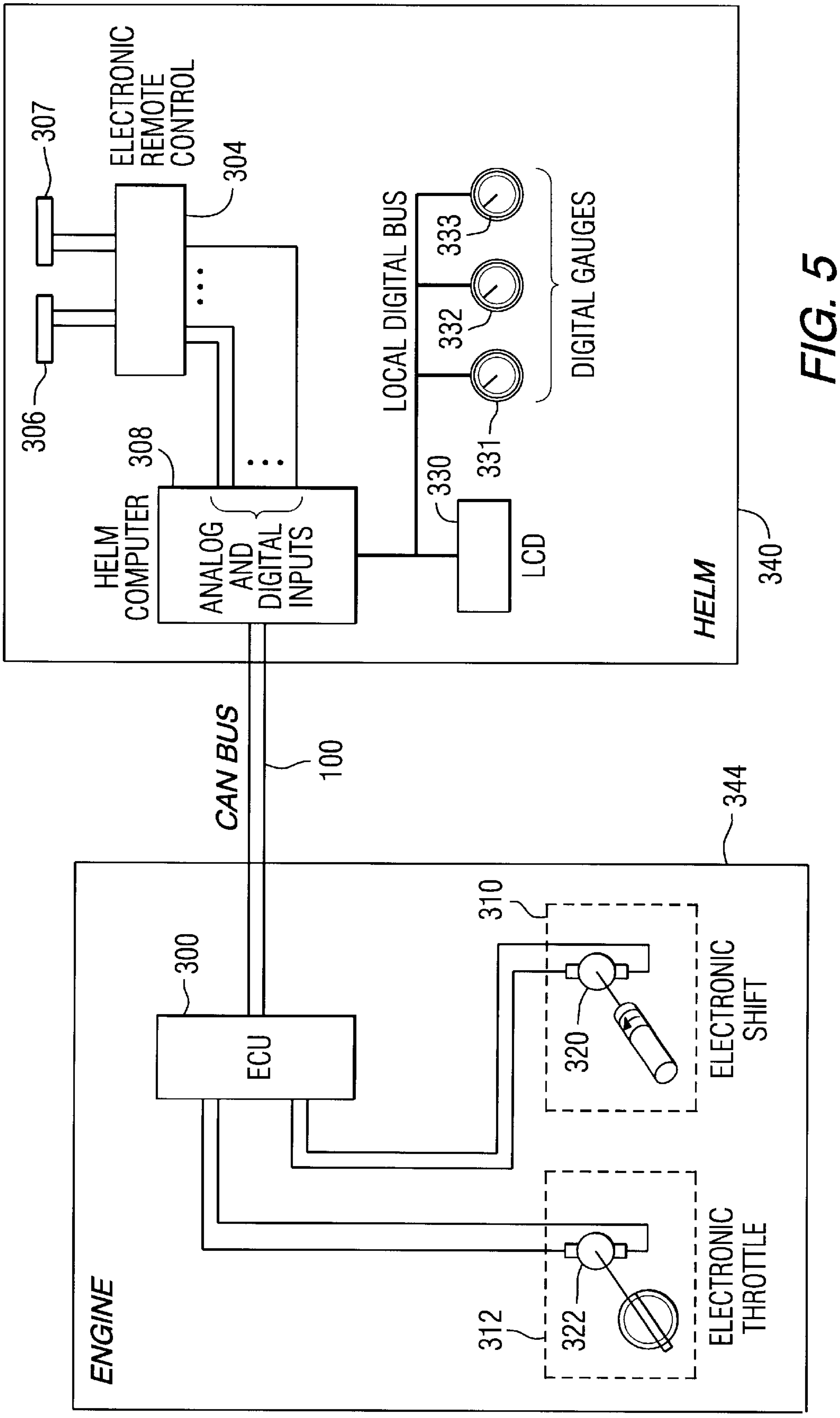
FIG. 5 shows a serial communication bus connected between a helm computer and an engine control unit.

A propulsion control system made in accordance with the present invention can utilize an engine with a controller 300, or engine control unit, that has full control over engine running conditions in terms of the generated torque and speed provided by the engine 344 as shown in FIG. 5. For the gasoline engine the system consists of a standard engine ECU 300 with additional control for electronic throttle and shift systems. For a diesel engine, the present invention comprises an ECU 300 with additional control for the shift and diesel fuel injector control. Other types of internal combustion engine can also be controlled by the present invention. The embodiment of the present invention shown in FIG. 5 demonstrates the inherent benefit of the present invention. The operator of the marine vessel uses electronic remote control 304 to command the desired torque of the engine or to shift the gears of the transmission. This comprises a manually controlled thrust command device, such as the throttle levers 306 and 307. In a system made in accordance with the present invention, the signals from the electronic remote control module 304 are first transmitted, as inputs, to a helm computer 308. The helm computer 308 converts the analog signals received from the electronic remote control module 304 into digital data and then transmits the digital data onto the serial bus 100 of the controller area network (CAN). The engine control unit 300 uses the CAN bus to receive the digital data from the helm computer 308 and, based on the contents of the digital message on the bus 100, actuates the electronic shift 310 and electronic throttle 312 actuators. It should be noted that the engine contains electromechanical actuators for the shift and throttle systems which are activated by signals received from the engine control unit 300. As a result, the only connection between these electronic shift and throttle actuators and the engine control unit 300 are the wires that provide electrical current to the motors, 320 and 322, associated with the shift and throttle actuators. No mechanical cables or linkages are needed in the system shown in FIG. 5 and this significantly improves the reliability of the system and provides smoother control, in both shifting and acceleration, of the marine propulsion system. As will be described in more significant detail below, the helm computer 308 is also connected in signal communication with a display 330, such as an LCD, and a plurality of digital gauges 331–333. While the helm computer 308 and the electronic remote control module 304 is located at the helm 340 of the marine vessel and the engine 344 is located near the stem of the marine vessel, the only connection required between the two subsystems shown in FIG. 5 is the serial bus 100 of the controller area network (CAN).

Figure 6:
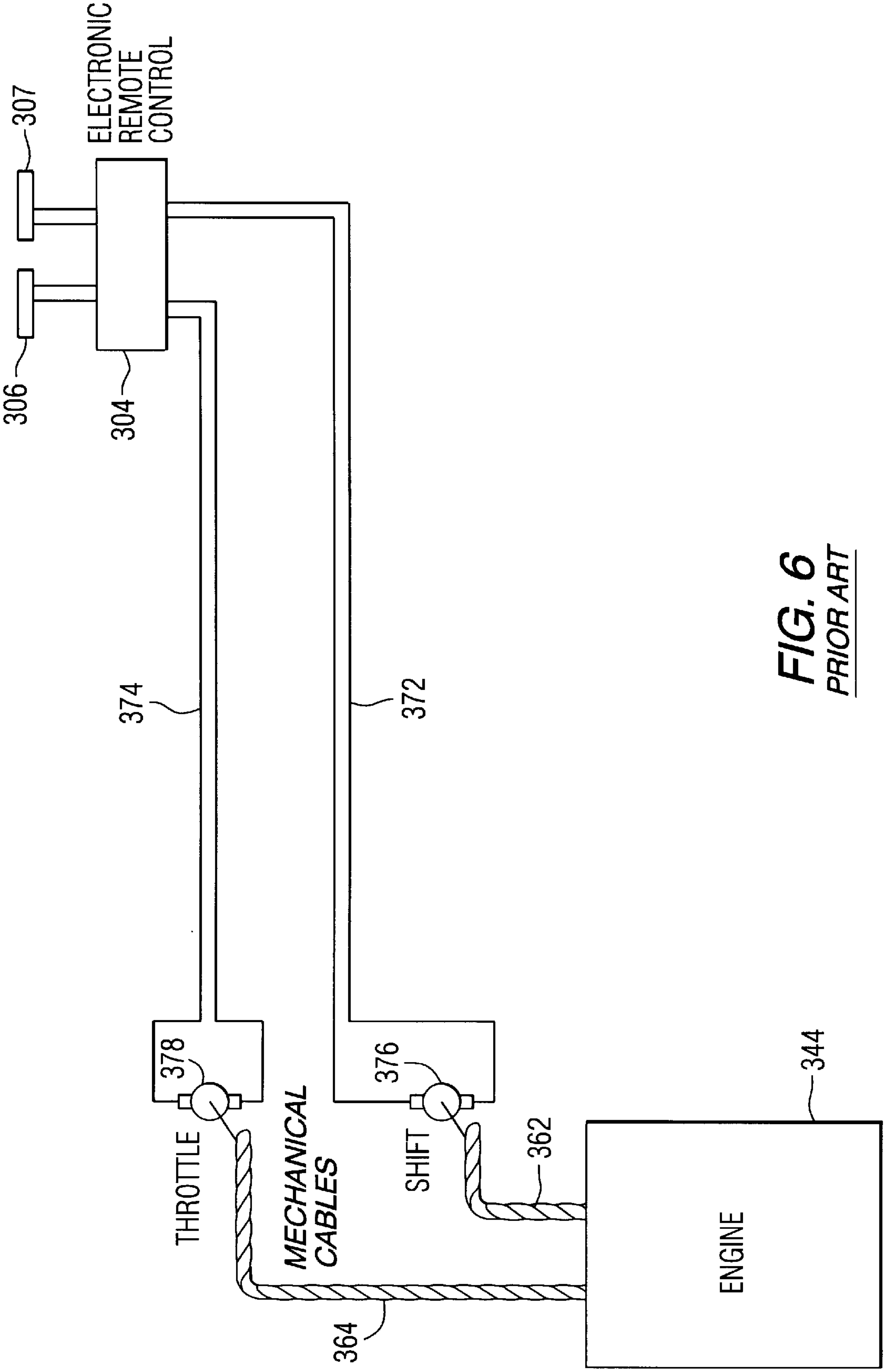
FIG. 6 PRIOR ART
FIG. 6 shows the connection of an electronic remote control throttle mechanism and steering and shifting mechanisms associated with an engine.

FIG. 6 shows a system that is generally available today and known in the prior art. In this prior art system, the signals from the transducers within the electronic remote control module 304 are provided directly to the unit that controls the actuation of the mechanical cables, 362 and 364, which operate the shift and throttle mechanisms, respectively. These cables consequently move the throttle plate of the engine or push the gears into commanded positions in the same fashion as with completely mechanical control systems. In that sense, the marine vessel operator achieves a benefit of smoothly operated electronic controls in a system such as that shown in FIG. 6, but the ultimate actuation of the shift and throttle mechanisms is purely mechanical and has the same inherent problems as are found in the systems operated completely with mechanical cables and linkages, even though electrical wires, 372 and 374, are used to provide current to motors, 376 and 378, that cause movement of the cables, 362 and 364, respectively.

Figure 7:
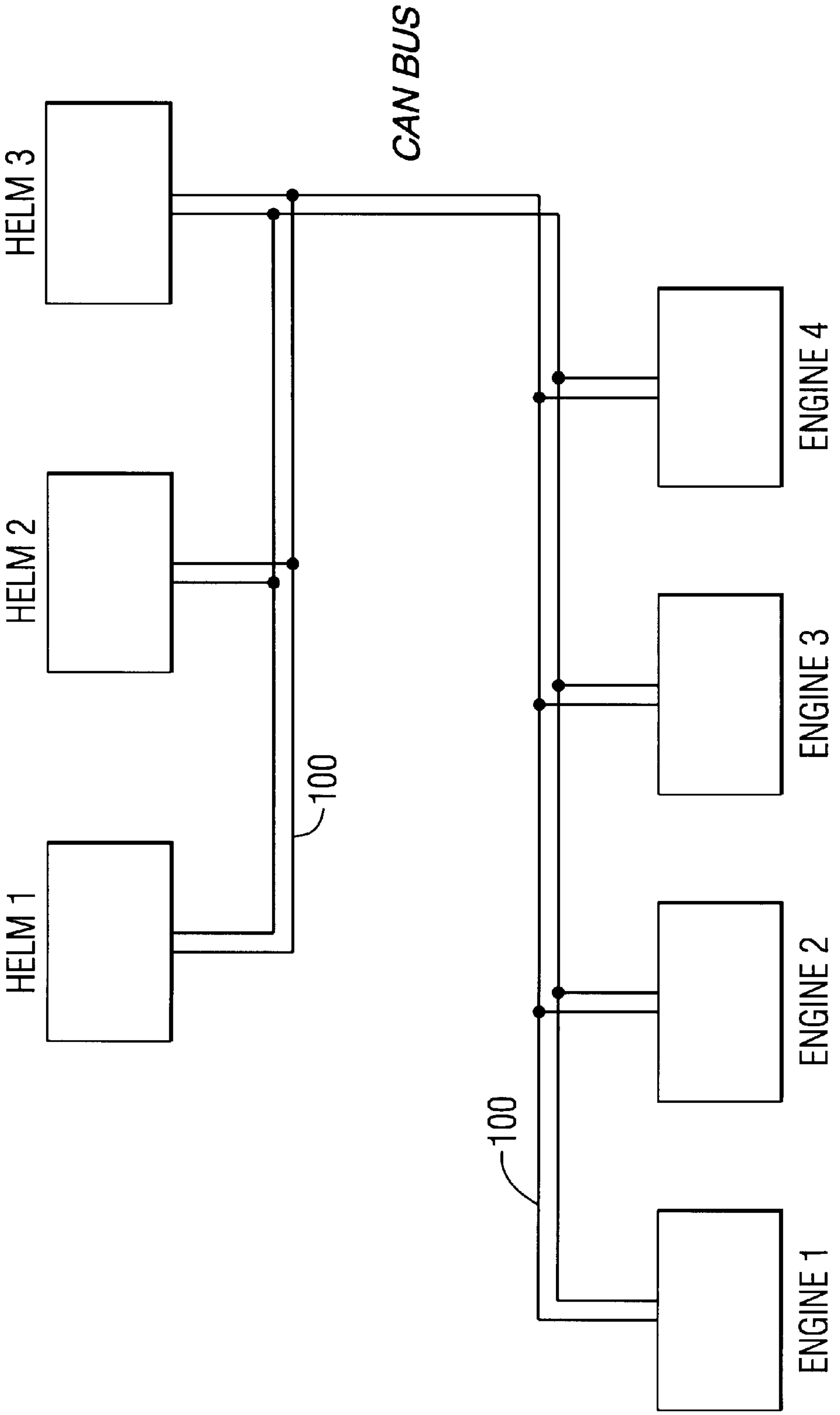
FIG. 7 shows a plurality of helm control stations and a plurality of engines all connected to a serial communication bus.

In larger marine vessels, the boat can have two or even three helms instead of just a single helm location. In addition, the marine vessel can be powered by two, three, or four engines. This general scenario is illustrated schematically in FIG. 7. In these types of applications, the full benefits of the present invention are more clearly recognizable. In marine vessels with multiple helms, the mechanical cables from throttle and shift modules must be connected between every helm location and every engine location. It is easy to imagine the complexity that a system of that type, with multiple helms and multiple engines, requires. It soon becomes extremely difficult, if not impossible, to rig a marine vessel of this type without some type of electronic controls to replace the many cables that would otherwise be required. In a control system made in accordance with the present invention, all of the parts of the system are connected and integrated using a single controller area network (CAN) bus. For example, in a system such as that represented in FIG. 7, if the marine vessel operator desires to shift engines three and four into reverse and engines one and two into forward, the operator simply moves the electronic controls for engines one and two forward and the electronic controls for engines three and four into reverse. The helm computer associated with the helm at which the operator is located will translate the input signals from the associated electronic remote control module 304, as described above in conjunction with FIG. 6, into digital data and transmit that digital data onto the digital bus 100. All of the four engines will receive the associated digital data intended for them from the bus 100. Each of the engines will be provided with its own priority code that will identify the intended recipient of the digital message provided by the helm computer located at the helm in which the operator provided the thrust control signals. In response to the operator moving the levers of the electronic remote control module 304 located at the helm in which the operator is currently located, the electronic remote control module 304 would transmit a series of messages onto the communication bus 100. For example, a first message would be sent to engine number 1 to place its transmission in forward gear. A second message would command engine number 1 to achieve an engine speed of 600 RPM. A third message would be sent to engine number 2 to place its transmission in forward gear and a fourth message would be sent to engine number 2 to set its engine speed to 600 RPM. Messages would be sent from the electronic remote control module 304 to engine number 3 to place its transmission in reverse and to set its engine speed to 600 RPM. Messages would also be sent to engine number 4 to place its transmission in reverse gear and to set its engine speed to 600 RPM. This could be accomplished with eight individual messages or, depending on the particular protocol and message packet configuration method used, four messages could be sent, with one message being sent to each engine, in which each message contained both the gear command and the engine RPM command. Regardless of the specific technique used, it should be understood that the helm computer would provide digital information on the bus 100 in response to analog or digital signals received from the electronic remote control module 304 and each of the messages would be provided with an identification code that the individual engines could recognize as being a command intended for their receipt. In response, engine control units 300 associated with each of the engines, would respond to the receive commands and direct their individual shift and throttle actuators to achieve the commanded gear setting and engine speed setting. This is done by the engine control units associated with each engine which produce the signals that will operate electrical motors on the engines which, in turn, will actuate electronics throttle and shift mechanisms.

A very common problem that exists with marine propulsion systems is that an operator sometimes performs “panic shifting” due to circumstances or inexperience. Inexperienced marine vessel operators often try to shift the engine from forward to reverse and back again, in an attempt to dock a boat. In these circumstances, the operator usually ignores engine RPM thresholds. If the shifting occurs at high engine speeds, this may result in excessive loading of the shift gears. Consequently, the gear set in the drive system of the engine can be permanently damaged when the shifting occurs at engine speeds beyond certain maximum thresholds. In a system made in accordance with the present invention, this type of problem can be avoided because the engine control unit 300 can be commanded not to issue the signal to the shift actuator from forward to reverse or vice versa unless the engine speed is within an acceptable range that allows for safe gear shifting.

Figure 8:
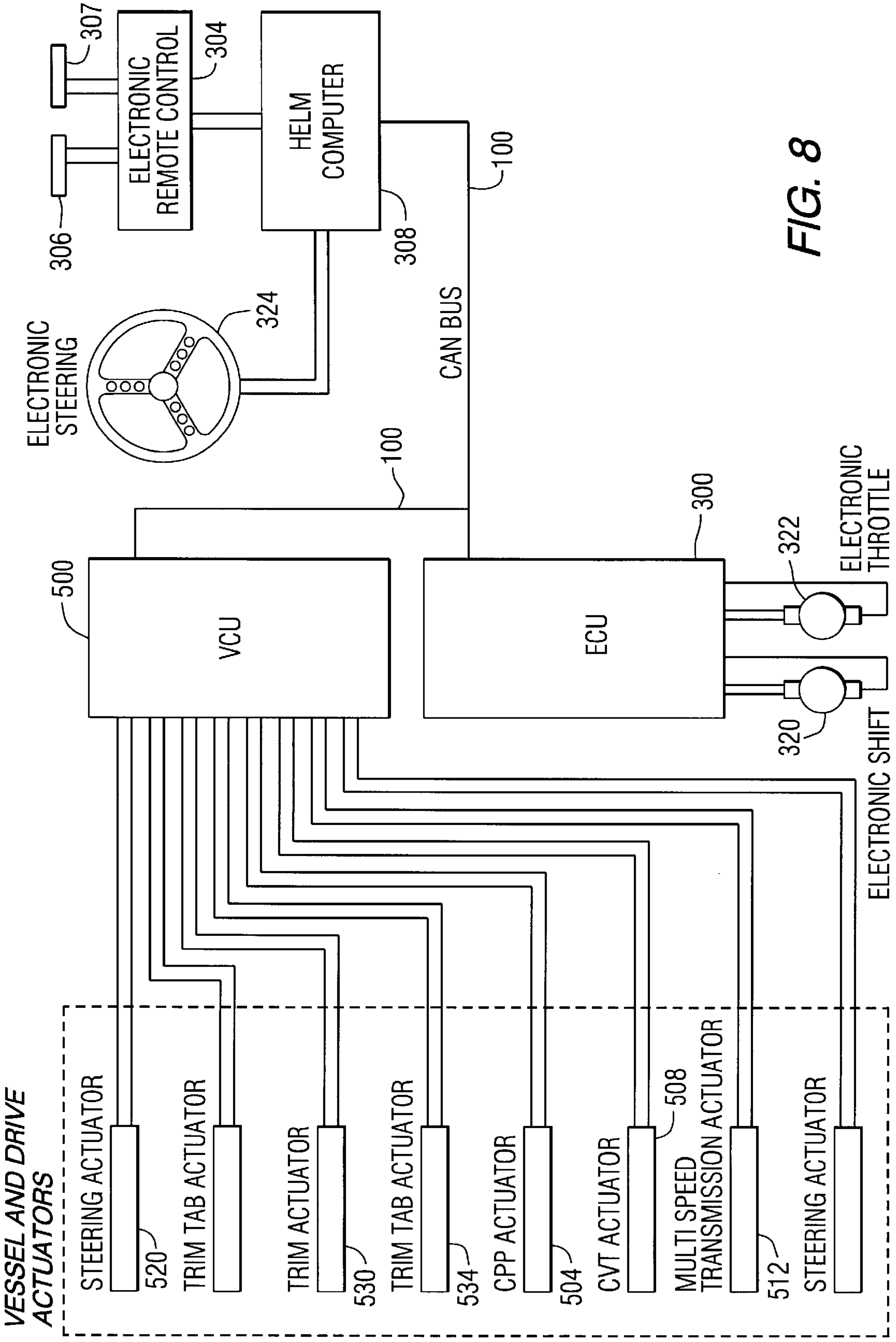
FIG. 8 shows a vessel control unit, an engine control unit, and a helm computer arranged to exchange signals relating to the control of a marine vessel.

FIG. 8 is a schematic representation of a more complex scenario than that described above. The marine vessel not only can have multiple helms, as described above in conjunction with FIG. 7, but also can have electronically controlled trim tabs, a multi-speed transmission, and electronically controlled engine trim with electronically controlled steering capabilities. All of these systems can be controlled by a vessel control unit (VCU) 500 or directly by the engine control unit (ECU) 300. In situations where both engine control units 300 and vessel control units 500 are present, the engine ECU 300 will transmit the data on the engine's instantaneous torque and speed to the serial communication bus 100 which is also connected in signal communication with the vessel control unit (VCU) 500. The VCU will, based on the engine torque and speed along with the operator input, actuate the automated drive such as a controllable pitch propeller (CPP) actuator 504. Based on these signals transmitted on the serial bus 100, the VCU may also transmit signals to a continuous variable transmission (CVT) 508 or shift a multi-speed automated transmission 512. The vessel control unit 500 can also actuate an electronic steering system 520 and steer the vessel in the desired direction based on signals received from the electronic steering control 524.

With continued reference to FIG. 8, the actuation of different vessel or drive actuators such as the controllable pitch propeller (CPP) 504, drive trim 530, trim tab actuators 534, or other devices, depends on the input generated by the marine vessel operator and a preset cost function. For example, if the marine vessel operator wishes to cause the marine vessel to achieve planing speed as fast as possible, the vessel control unit 500 can be based on the input from the operator and adjust the loading of the engine by continuously adjusting these subsystems in order to achieve the objective of planing speed as fast as possible. The settings of the control can be preset for generic boat operation and then optimized for the particular boat and load in the current circumstance within the constraints of the engines speed and vessel inclination angle as a function of time. In marine vessels known to those skilled in the art, the operator typically has manual control over these systems and must manually adjust the trim of the drive or the position of the trim tabs. Another possible example is the optimization of the fuel consumption at cruising speed. The operator can set a target to always have minimum fuel consumption when the marine vessel is operated at cruising speed. The present invention can, based on such a command, recognize that the vessel is in the cruising mode and then adjust the position of the trim tabs, the propulsion system, or the drive trim and the position of the blades of a variable pitch propeller in order to achieve this optimized fuel consumption. Alternatively, the control system can either adjust the continuously variable transmission or shift the multi-speed transmission into an appropriate gear ratio to achieve this objective.

The present invention also allows a very simple integration of the features of an automatic pilot system, collision avoidance system, or shallow water avoidance system. The present position of the vessel is obtained through signals received from a global positioning system (GPS). Based on an operator input for the desired destination and selected cost function (i.e. time or fuel consumption), the present invention will devise a route that will meet the minimum cost requirement based on the information from the electronic charting system or chart plotter. If the marine vessel has an on-board radar or forward-looking sonar system, the vessel can also implement much more complex functions such as collision or shallow water avoidance. In this scenario, the operator of the marine vessel inputs the final destination with the options to include shallow water and collision avoidance with minimum time or minimum fuel consumption as the criteria for guiding the cost function. In another embodiment, the operator can have the remote control unit and control the movement of the vessel from a remote location.

Figure 9:
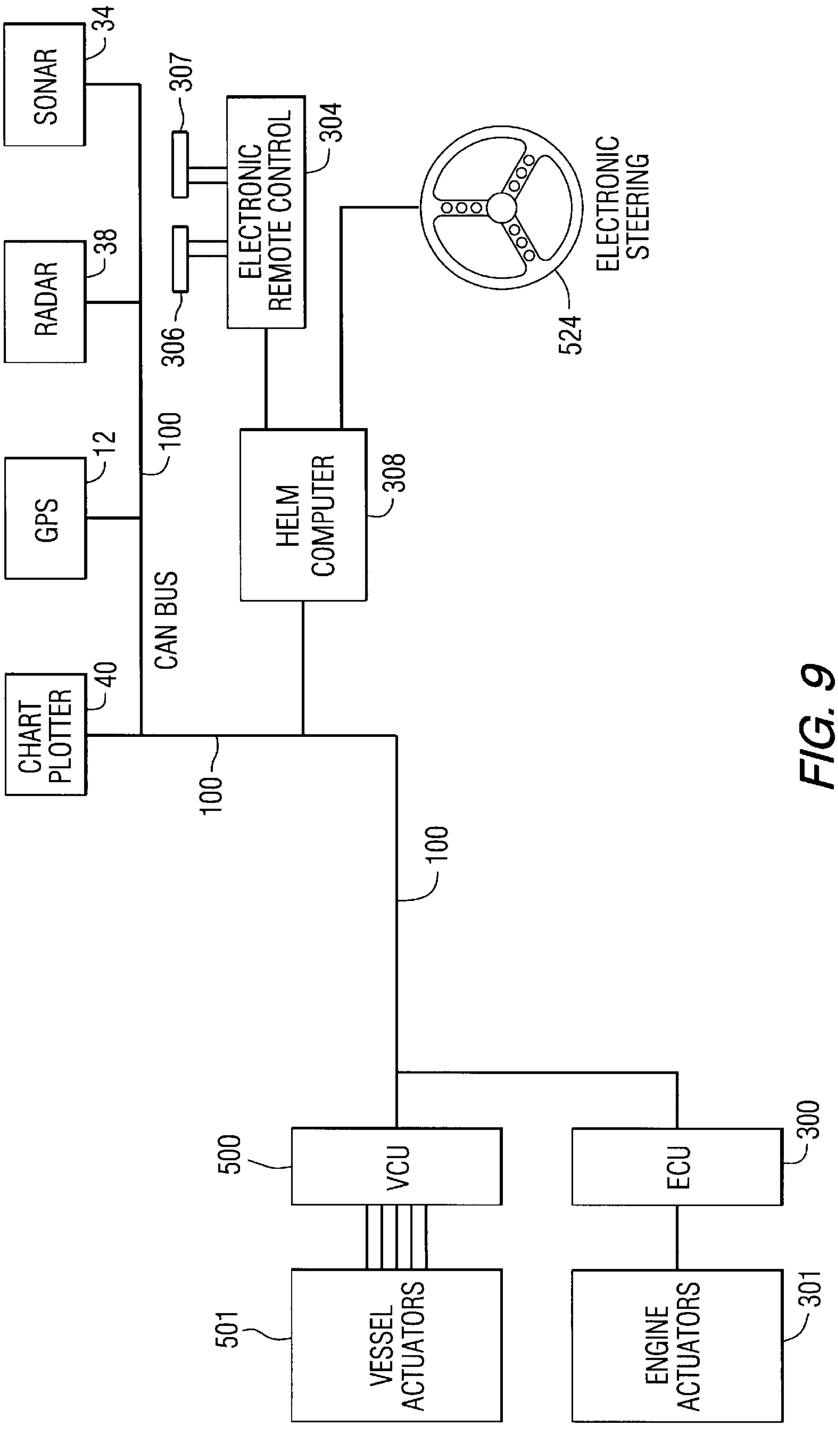
FIG. 9 shows the connection scheme with a serial communication bus, a vessel control unit, an engine control unit, and a helm computer.

In FIG. 9, the vessel control unit 500 and engine control unit 300 are shown associated with their respective actuators, 501 and 301, which are simplified to represent the associated components associated with the VCU and ECU, as described above in conjunction with FIGS. 5–8. Also shown in FIG. 9 is the serial bus 100 that is connected in serial communication with the chart plotter 40, a global positioning system (GPS) 12, a target acquisition radar system 38 and a sonar depth sensor 34. The helm computer 308 is connected to the serial bus 100 to provide digital signals to the bus 100 representing the analog or digital signals received by the helm computer 308 from the electronic remote control module 304 and the electronic steering system 524.

With continued reference to FIG. 9, it can be seen that the main components of the system, comprising the vessel control unit 500, the engine control unit 300, the chart plotter 40, the GPS system 12, the radar 38, the sonar 34, and the helm computer 308, are all connected to the serial bus 100 for transmitting signals between these components. It is also important to understand that one of the components, such as the vessel control unit 500 is selected as having the bus access manager resident within its logic system. As a result, that bus access manager is designated as a "King" in the CAN Kingdom network provided by Kvaser Consultants AB of Sweden in a particularly preferred embodiment of the present invention. As a result, if one of the devices, such as the global positioning system (GPS) 12 or the chart plotter 40, is added to the system after the initial configuration of the propulsion system in conjunction with the marine vessel, the bus access manager will make sure that the GPS and chart plotter are recognized as legitimate components on the control system and are assigned appropriate priority levels to allow them to communicate efficiently and effectively on the serial bus 100. Without some type of bus access manager, additional components can not be effectively added to, or deleted from, a system subsequent to its original manufacture and configuration in conjunction with a marine vessel.

Modern marine engines are equipped with a variety of sensors that can be used for the purpose of diagnostics in order to monitor and detect existing or future problems. These sensors can provide valuable information on the state of the health of fuel injectors, spark plugs, lubrication systems, temperature, water and oil pressure, vibration, voltage, electrical power consumption, and many other parameters that can be monitored for the purpose of predicting the onset of a future component failure. The present invention allows the integration of the data provided by the various sensors and conversion of the data via a serial bus into a display unit placed at the helm of the vessel. The user can obtain automated indication of existing and potential problems and also be provided with information on how to service the engine if such an option is available. Alternatively, the information can be transferred, via a form of wireless link, to a service response center where software can analyze the signatures collected from the variety of sensors and, based on this analysis, determine a diagnostic assessment. The communication can be from the boat to another remotely located device or from a remote device to the boat. Systems of this type are disclosed in U.S. patent application Ser. Nos. 09/428,690 (M09349) and 09/429,455 (M09358) which were filed on Oct. 28, 1999 and assigned to the assignee of the present application. This feature can be used by the present invention to implement a true predictive maintenance system or a "just-in-time" maintenance system and, as a result, reduce the overall cost of the ownership of the marine vessel. The possibility to rerun remote diagnostics will allow the owner or operator of a marine vessel to perform the diagnostic test without actually visiting a repair or maintenance facility. It will also allow a marine repair facility to be prepared for the marine vessel when it is eventually brought to the facility for maintenance or service. The present invention can also be expanded to include not only engine diagnostics, but other vessel subsystems such as electrical motors for hydraulic pumps, bilge pumps, fresh water pumps, trim tabs, and electrical systems on the vessel. With these features, the overall ease of maintenance and operation of the marine vessel will be significantly enhanced because the present invention will allow the marine vessel operator to operate the diagnostic systems of the boat subsystems without having to visit a service center.

Figure 10:
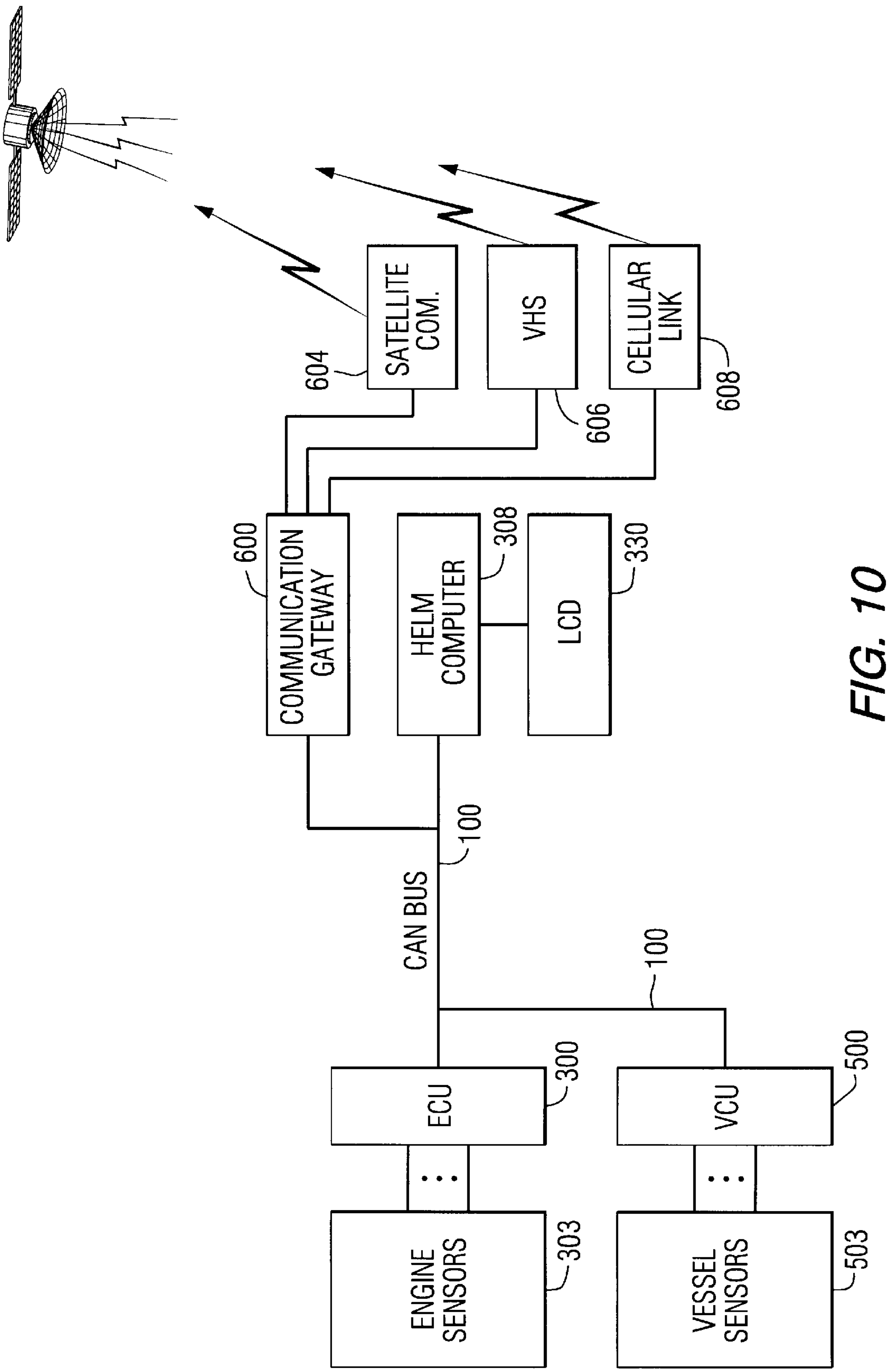
FIG. 10 shows a communication system connected to a serial communication bus through a communication gateway.

With respect to FIG. 10, the communication gateway 600 is connected to a satellite communication system 604, a VHS 606, and a cellular link 608. The helm computer 308 is connected to a display 330, such as an LCD, for communication with the operator. In addition, the communication gateway 600, the helm computer 308, the vessel control unit 500, and the engine control unit 300 are all connected in signal communication with the serial communication bus 100. The engine sensing components 303 and the vessel sensing components 503 are connected to the ECU 300 and VCU 500, respectively, and signals received from these sensing components are transmitted by the associated control units to the serial communication bus 100.

Figure 11:
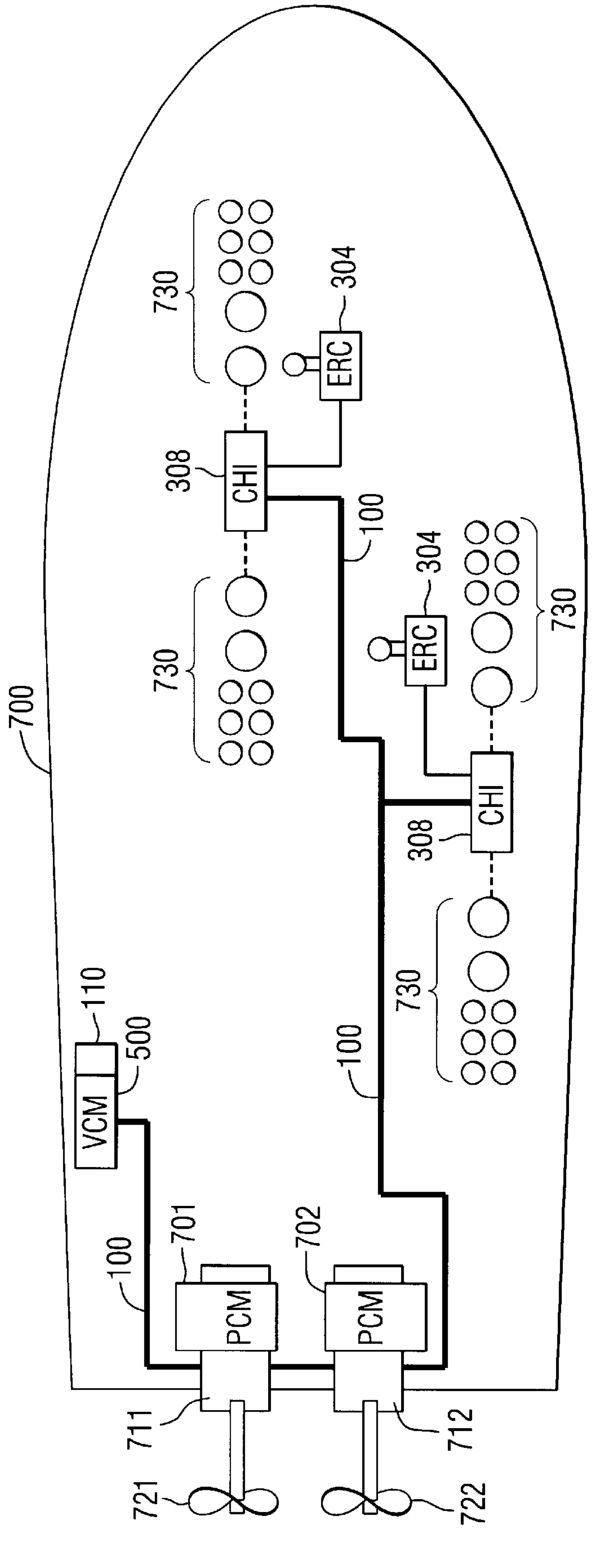
FIG. 11 is a highly schematic representation of a marine vessel with two helm positions and two outboard motors.

FIG. 11 shows the outline of a marine vessel 700 and the location of several elements of the present invention. At the stern of the marine vessel 700, two propulsion control modules, 701 and 702, are each associated with an outboard motor, 711 and 712, respectively. Although shown schematically in FIG. 11, it should be understood that each of the propulsion units, such as the outboard motors, comprises an internal combustion engine which, through a series of shafts and gears, drives an associated propeller, 721 and 722, respectively. Although not necessary in all embodiments of the present invention, the propeller can be a controllable pitch propeller. A serial bus 100 extends throughout the marine vessel 700, where needed, and the various microprocessors associated with the control system are each connected in signal communication with the serial communication bus 100. The marine vessel 700 shown in FIG. 11 is provided with two helm locations and each helm location is provided with a helm computer 308 which serves as a customer helm interface (CHI). Each customer helm interface is provided with a plurality of gauges 730 and displays that allow the microprocessors to communicate information to the marine vessel operator. Also shown at each helm is an electronic remote control module 304 that allows the operator to control the thrust, both in magnitude and direction, provided by each of the propulsion units, such as the outboard motors, 711 and 712. The vessel control module 500 comprises a microprocessor that, in a typical application of the present invention, also serves as the bus access manager 110 as described above. In a particularly preferred embodiment of the present invention, a controller area network (CAN) is used to define the protocol and maintain an orderly exchange of information on the serial bus 100. The bus access manager 110 can be a CAN Kingdom network such as that which is provided by Kvaser Consultants AB of Sweden.

With continued reference to FIG. 11, a significant benefit provided by the present invention is that, subsequent to the original configuration of a marine vessel 700 with a control system made in accordance with the present invention, devices can be added to the system without the need of intervention or involvement by the original manufacture of the propulsion system or the boat outfitter that combine the control system with the boat. For example, if the purchaser of the marine vessel 700 decides to add a device to the control system, the bus access manager 110 is able to incorporate that new device without the need for the boat owner to return to the original manufacture (e.g. Mercury Marine) or to a boat company (e.g. Bayliner or SeaRay) that configured the control system on the marine vessel. As an example, if the owner of the marine vessel 700 wishes to add a new gauge, such as a temperature gauge that monitors the temperature of the water in which a marine vessel is operated, that gauge can be connected directly to the serial communication bus 100 along with a temperature transducer which measures the water temperature surrounding the marine vessel 700. That temperature transducer would also be connected directly to the serial communication bus 100. As long as both the transducer and the gauge are properly configured to provide acceptable signals to the controller area network, the operator can add the gauge and transducer to the control system and the bus access manager will accept those two new devices into the control system following an initial interrogation to assure that both devices will properly operate according to the rules of the control system. Following that initial interrogation and acceptance procedure, the temperature transducer can periodically transmit signal packets on the serial bus 100 which represent the temperature of the water surrounding the marine vessel and the gauge, typically located at the helm locations, would receive that signal packet on the serial bus 100 and display the results of the measurement for the operator. In the illustration shown in FIG. 1, it would be likely that the owner of the marine vessel 700 would prefer to add two gauges, one at each helm location, that would both display the results provided by the temperature transducer. The example of a temperature transducer and two gauges has been used as an illustration to describe how new input and output devices can easily be added to the system as long as they are configured to cooperate with the controller area network (CAN) and use proper protocols in their communications with the controller area network. The provision of the bus access manager 110, such as the CAN Kingdom network, allows the subsequent addition of devices which would not be easily implemented without some type of bus access manager 110 associated with the controller area network.

With continued reference to FIG. 11, it should be understood that every device connected to the serial communication bus 100 is connected to a microprocessor which conditions the signal for the CAN bus or is provided with a controller area network circuit, commonly referred to as a "CAN chip", that incorporates sufficient intelligence to perform the necessary receipt and interrogation of signals on the serial bus 100 to determine various coded bit patterns and determine whether the message is intended for the device with which the controller area network circuit is associated. This technology involving the use of the "CAN chip" is widely known and used in many different types of industrial applications (e.g. SDS provided commercially by the Honeywell Corporation) and automobile control systems.

It is important to note the significant difference between a control system used in an automobile and a control system used in a marine vessel. When an automobile is manufactured by the original equipment manufacturer, such as General Motors or Ford, all of the components used in the automobile are selected by the original manufacturer and typically not altered or replaced by the eventual purchaser of the automobile. For example, the owner of a automobile does not typically replace the door lock system, the braking system, or the lighting system of the automobile with aftermarket systems. As a result, the original manufacturer can implement a controller area network (CAN) to interconnect this original equipment to each other and to a master controller so that the manually controlled switches and the various actuators on the automobile are all compatible with each other. This can be done by the original manufacturer without concern that a later outfitter or system integrator will attempt to change that original control configuration. These assumptions can not be made with regard to marine vessels. In the marine pleasure craft market, it is very typical for the marine propulsion unit to be provided by one company, such as the Mercury Marine division of the Brunswick Corporation, and the marine vessel or boat to be provided by a separate and independent company. In some situations, the boat company purchases the marine propulsion system and installs it on the boat prior to sale to the purchaser of the boat. Alternatively, some boats are manufactured by a boat company with a system integrator purchasing the marine propulsion system from a different supplier and then integrating the marine propulsion system into the boat. Finally, regardless of the manner in which the marine propulsion system, control system, and marine vessel are integrated together, the final purchaser of the marine vessel may decide to add various devices subsequent to the original integration of the control system with the marine vessel. All of these possibilities make the marine pleasure craft industry significantly different in this respect from the automobile industry. Therefore, the normal implementation of a controller area network on a marine vessel, without some type of bus access manager 110, makes subsequent alteration of the control system exceptionally difficult with a low probability of success. The present invention, on the other hand, provides a bus access manager, such as the CAN Kingdom network which allows any of the various parties involved in the manufacture and use of the marine vessel to add or delete devices as part of the vessel control system.

Figure 12:
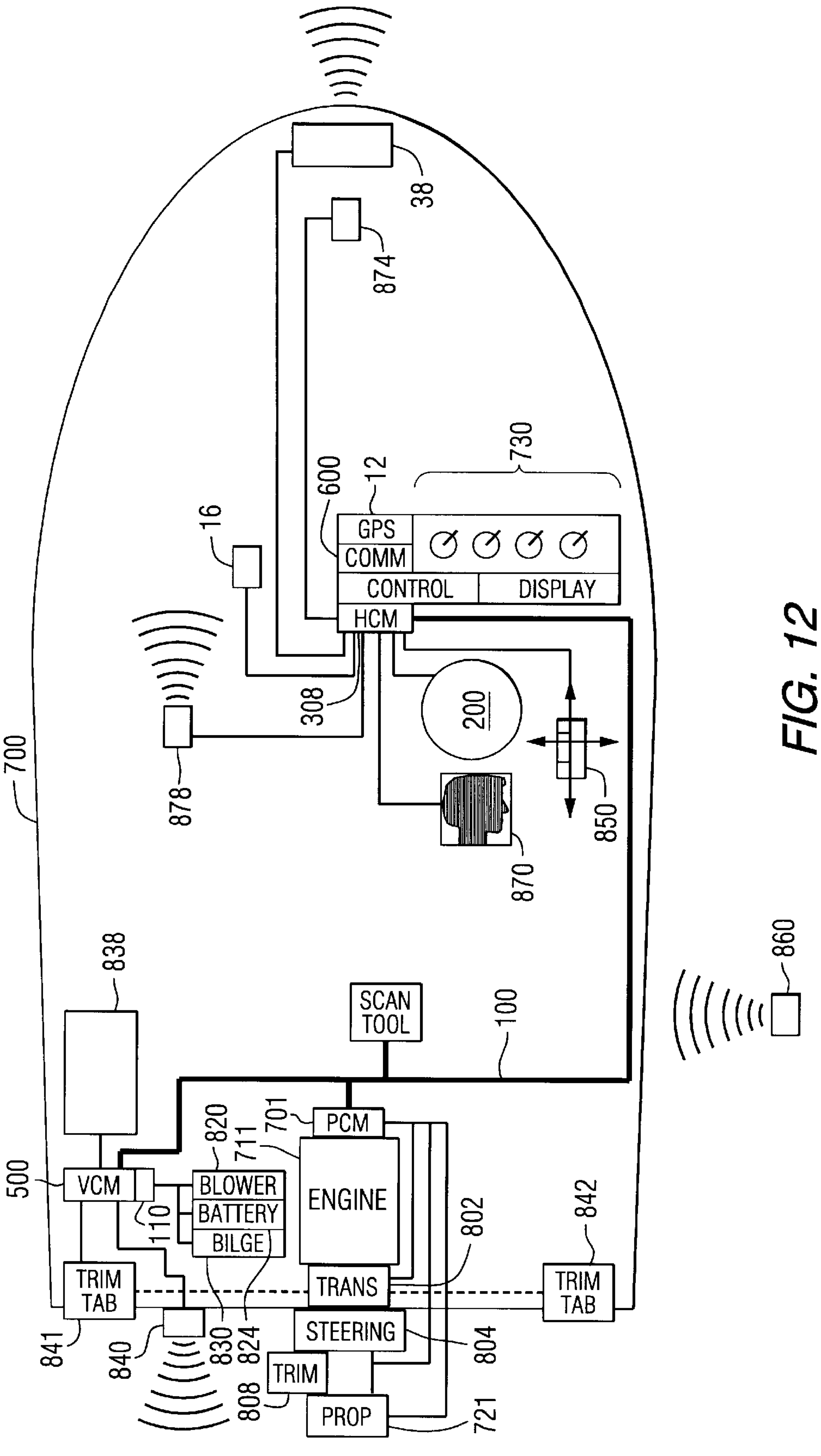
FIG. 12 shows a marine vessel with a plurality of input and output devices arranged throughout the vessel and connected to a serial communication bus.

FIG. 12 shows the schematic representation of a marine vessel 700 provided with a wide variety of devices which are all connected in signal communication with a serial communication bus 100 such as a bus of a controller area network (CAN). The marine vessel 700 in FIG. 12 is schematically shown with a single helm position and a single engine 711. The engine is provided with a transmission 802, a steering actuator 804, and a trim control system 808. The propeller 721 is driven by the engine 711 to provide propulsive thrust for the marine vessel 700. A vessel control module 500 is connected in signal communication with a blower 820, a battery 824, and a bilge monitor 830 which can sense various conditions in the bilge of the marine vessel 700, such as water level or the accumulation of fumes. A live well 834 is provided to store fish in an environment that keeps the fish alive. A depth finder 840 is shown schematically at the stern of the marine vessel 700. Two trim tabs, 841 and 842 are connected in signal communication with the vessel control module 500 which, in turn, is connected to the serial communication bus 100. A collision avoidance system 38 provides a radar signal to detect the presence of objects in front of the marine vessel. Attitude sensors, such as pitch and yaw sensors 16 determine the physical attitude of the vessel to aid the vessel control module 500 in controlling the trim 808 of the propulsion system and the trim tabs, 841 and 842. Also shown in FIG. 12 is ajoystick module 850 which can allow an operator control of the vessel during docking procedures. A keyless entry system 860 can allow an operator to unlock various security devices as the marine vessel operator approaches the boat. An auto pilot system 870 can control the movement of the marine vessel according to instructions provided by the operator. Also shown schematically in FIG. 12 is a lighting system 874 and an emergency locator device 878.

It should be understood that FIG. 12 is intended to provide a highly schematic representation of a marine vessel in which a large number of input and output devices are all connected in signal communication, either directly or indirectly, with the serial communication bus 100 and the other devices. For example, the blower 820, battery 824, and bilge condition monitor 830 are all connected to the vessel control module (VCM) 500 which, in turn, creates a digital message packet according to the controller area network protocol and transmit that message packet to the serial bus 100. The information contained in the message packet can be received by intended recipient devices, such as the gauges 730, and displayed for the operator of the marine vessel 700. The steering mechanism 200, which is manually controlled, and the steering actuator 804 operate in the manner described above in conjunction with FIG. 4. The auto pilot system 870 can receive destination positions from the operator and, in conjunction with the GPS 12 and a chart plotter system, plot a course from the current position of the marine vessel to the desired destination position entered by the operator. In plotting that course, the inputs from the depth finder 840 and the collision avoidance system 38 are used to make sure that the course is safely traversed. It should be understood that many other devices can be added to the system and, conversely, that all of the devices shown in FIG. 12 are not required in all embodiments of the present invention. It should also be noted that the addition and removal of devices from the control system is made possible by the inclusion of a bus access manager that is used in conjunction with the controller area network. In the example shown in FIG. 12, the bus access manager 110 would likely be included as part of the control system within the vessel control module (VCM) 500. Alternatively, the bus access manager 110 can be included as part of the helm control module 308 or the propulsion control module (PCM) 701. The bus access manager 110 operates as the “King” in the CAN Kingdom network to make sure that all of the other devices are behaving according to a preselected protocol and set of rules and that each device added to the system is properly configured and prioritized to provide messages on the serial bus 100 in accordance with those rules and protocols.

Although the present invention has been described in conjunction with many different types of specific input and output devices, it should be understood that the present invention is more directly involved in the control system that incorporates the serial communication bus in conjunction with a controller area network and a bus access manager. The use of this combination allows the addition and removal of the devices from the control system subsequent to the original configuration of the control system with a marine vessel. Many of the individual devices connected to the serial bus 100, as described above, are individually well known to those skilled in the art. For this reason, the specific operation of each of the individual input devices or output devices or systems have not been described in detail. For example, U.S. Pat. No. 3,958,524, describes a multiple helm control system. U.S. Pat. No. 3,200,782, describes a trim tab actuation system. An auto pilot system is described in U.S. Pat. No. 5,884,213, and a navigation system for a marine vessel in low light conditions is described in U.S. Pat. No.

5,751,344. The use of a navigation system that incorporates a chart plotter is described in U.S. Pat. No. 5,592,382, and a navigation system is described in U.S. Pat. No. 5,075,693. U.S. Pat. No. 4,939,661, describes an apparatus for a video marine navigation plotter with electronic charting. A constant depth control system is described in U.S. Pat. No. 5,525,081, in conjunction with a trolling motor that is used as a propulsion system. The use of a GPS is described in U.S. Pat. No. 5,467,282, and an integrated vehicle positioning and navigation system is described in U.S. Pat. No. 5,610,815. U.S. Pat. No. 5,983,159, describes a location determination system using signals from fewer than four satellites of a GPS. One type of navigation system is described in U.S. Pat. No. 5,955,973, and a marine automatic pilot rudder motor control system is described in U.S. Pat. No. 3,838,656. Navigation systems and components relating to the navigation of a vehicle, particularly in conjunction with GPS systems are described in U.S. Pat. No. 5,390,125, and U.S. Pat. No. 5,155,490. Numerous types of chart plotter systems are commercially available from Raytheon and Furuno.

Throughout the description of the present invention, reference has been made to the controller area network (CAN) and the CAN Kingdom network that is available from Kvaser Consultants AB of Sweden. These systems are known to those skilled in the art. The controller area network has been known for many years and has been implemented in various types of industrial control apparatus and in automobile applications. U.S. Pat. No. 5,469,150, describes one specific adaptation of a controller area network system and also describes the protocol of messages structured for transmission onto a serial bus using the controller area network system. The present invention has also been described in conjunction with the use of a bus access manager, such as the CAN Kingdom network. The CAN Kingdom network is available from Kvaser Consultants AB of Sweden. Certain elements of the CAN Kingdom network are described in U.S. Pat. No. 5,383,116, U.S. Pat. No. 5,446,846, and U.S. Pat. No. 5,596,911. Many types of display mechanisms and navigational aids are available commercially from Raytheon Marine company. In addition, navigation systems incorporating wireless voice and data, GPS, and vehicle interfaces to provide locations, specific security and information services to drivers are now commercially available for automobile applications from the Motorola Corporation.

Although each of the specific input devices and output devices described above in conjunction with the present invention are well known to those skilled in the art and can be implemented with any type of communication system or network, the combination of a controller area network and a bus access manager in conjunction with a control system of a marine vessel provides unique advantages for both the manufacturer of the propulsion system and the eventual marine vessel operator. Although the present invention has been described and illustrated to show several particularly preferred embodiments with specific input devices and output devices connected to a serial bus, it should be understood that many different combinations of input and output devices can also be used within the scope of the present invention.

What is claimed is:

1. A marine vessel control system, comprising:

a marine propulsion system attached to said marine vessel;

a communication bus;

a controller connected in signal communication with said communication bus;

a plurality of devices connected in signal communication with said communication bus;

a bus access manager in signal communication with said controller to regulate the incorporation of additional devices to said plurality of devices in signal communication with said communication bus; and whereby said controller is connected in signal communication with each of said plurality of devices on said communication bus.

2. The system of claim 1, wherein:

said plurality of devices comprises a steering transducer and a steering actuator, said steering transducer being connected to a manually actuated steering mechanism, said steering transducer providing a steering signal on said communication bus which is representative of a physical position of said manually actuated steering mechanism, said steering actuator being attached to said marine propulsion system for changing the position of said marine propulsion system relative to said marine vessel, said steering actuator receiving said steering signal from said communication bus.

3. The system of claim 1, wherein:

said plurality of devices comprises a manually actuated thrust control mechanism and an engine controller which are both connected in signal communication with said communication bus, said engine controller controlling the operation of a fuel system of fueling of an engine which is connected in torque transmitting relation with said marine propulsion system.

4. The system of claim 3, wherein:

said manually actuated thrust control mechanism is a manually movable throttle control lever.

5. The system of claim 1, wherein:

said plurality of devices comprises a course controller, said course controller being connected in signal communication with said communication bus and having an input for receiving a manually entered destination position, said plurality of devices further comprising a global positioning system which is connected in signal communication with said communication bus and having an input for receiving a signal which is representative of a current position of said marine vessel, said course controller being configured to determine a course from said current position to said destination position.

6. The system of claim 5, further comprising:

a chart plotter connected in signal communication with said communication bus.

7. The system of claim 1, wherein:

said plurality of devices comprises a trim tab controller.

8. The system of claim 1, wherein:

said plurality of devices comprises a manual docking system.

9. The system of claim 1, wherein:

said plurality of devices comprises a plurality of gauges.

10. The system of claim 1, wherein:

said plurality of devices comprises a collision avoidance system.

11. The system of claim 1, wherein:

said plurality of devices comprises a manually actuated docking system.

12. The system of claim 1, wherein:

said plurality of devices comprises a depth detector.

13. The system of claim 1, wherein:

said plurality of devices comprises a liquid level sensor.

14. The system of claim 1, wherein:

said plurality of devices comprises a drive trim controller for changing the trim angle of said marine propulsion system.

15. The system of claim 1, wherein:

said communication bus is a serial communication bus.

16. The system of claim 15, wherein:

said communication bus incorporates a controller area network.

17. The system of claim 1, wherein:

said plurality of devices comprises a visible display showing a plurality of status conditions relating to said marine propulsion system and said marine vessel.

18. A marine vessel communication system, comprising:

a marine propulsion system attached to said marine vessel;

a communication bus;

a controller connected in signal communication with said communication bus;

a plurality of input devices connected in signal communication with said communication bus, said plurality of input devices providing signals to said communication bus relating to status conditions relating to parameters selected from the group consisting of a position of a manual steering device, a depth of water beneath said marine vessel, a manually provided thrust command, a radar signal, a GPS signal, manually controlled switches, pitch and yaw sensors, a speedometer, a tachometer, and a chart plotter;

a plurality of output devices connected in signal communication with said communication bus, said plurality of output devices providing signals to said communication bus relating to commands to devices selected from a group consisting of a steering actuator, a propeller pitch position, an engine speed control mechanism, trim tabs, propulsion unit trim, a transmission gear selector, and a lamp;

a bus access manager in signal communication with said controller to regulate the incorporation of additional input and output devices to said plurality of devices in signal communication with said communication bus; and whereby said controller is connected in signal communication with each of said plurality of devices.

19. The system of claim 18, wherein:

said plurality of input devices comprises a manually actuated thrust control mechanism and an engine controller which are both connected in signal communication with said communication bus, said engine controller controlling the fueling of an engine which is connected in torque transmitting relation with said marine propulsion system, said manually actuated thrust control mechanism being a manually movable throttle control lever.

20. The system of claim 19, wherein:

said plurality of devices further comprises a course controller, said course controller being connected in signal communication with said communication bus and having an input for receiving a manually entered destination position, said course controller being configured to determine a course from said current position received from said GPS to said destination position, said plurality of devices further comprising a plurality of gauges, said communication bus being a serial communication bus, said communication bus incorporating a controller area network.

21. A method of operating a communication system of a marine vessel, comprising the steps of:

providing a marine propulsion system attached to said marine vessel;

providing a communication bus;

connecting a controller in signal communication with said communication bus;

connecting a plurality of devices in signal communication with said communication bus;

regulating the incorporation of additional devices to said plurality of devices in signal communication with said communication bus;

transmitting steering command signals on said communication bus from a first one of said plurality of devices which is a manually actuated steering mechanism to a second one of said plurality of devices which is a steering actuator attached to said marine propulsion system.

22. The method of claim 21, further comprising:

transmitting thrust command signals on said communication bus from a third one of said plurality of devices which is a manually actuated throttle command mechanism to a fourth one of said plurality of devices which is a fuel per cycle controller attached to an engine of said marine propulsion system.

23. The method of claim 22, further comprising:

receiving current position signals by a fifth one of said plurality of devices from an external global positioning system and transmitting said current position signals on said communication bus from said fifth one of said plurality of devices to a sixth one of said plurality of devices which is a chart plotter device.

24. A control system for controlling the operation of a marine vessel, comprising:

a communication bus;

a controller connected in signal communication with said communication bus;

one or more input devices connected in signal communication with said communication bus and selected from the group consisting of a manually controlled steering mechanism, an engine speed sensor, and a manually controllable propulsion thrust demand mechanism;

one or more output devices connected in signal communication with said communication bus and selected from the group consisting of a steering actuator, at least one gauge, and an engine speed controller; and a bus access manager in signal communication with said controller to regulate the incorporation of additional input devices to said plurality of input devices in signal communication with said communication bus.

25. The control system of claim 24, wherein:

said communication bus is a serial communication bus.

26. The control system of claim 25, wherein:

said serial communication bus is a portion of a controller area network.

27. The control system of claim 24, wherein:

said one or more input devices further comprises a speedometer which provides a signal which is representative of a speed of said marine vessel relative to a surrounding body of water and a depth sensor which provides a signal representative of the depth of said body of water beneath said marine vessel; and said one or more output devices further comprises a propeller blade pitch actuator, an actuator for adjusting the trim position of a propulsion system of said marine vessel, and an actuator for adjusting the position of a trim tab system of said marine vessel.

28. The control system of claim 24, wherein:

said one or more input devices further comprises a global position system, a chart plotting system, and a manually controlled destination entry device.

29. The control system of claim 24, wherein:

said one or more input devices further comprises a weather information source, a wind speed sensor, a fuel level sensor, and a lubrication level sensor.

30. The control system of claim 29, further comprising:

a marine propulsion system;

a marine vessel, said marine propulsion system being attached to said marine vessel.

31. The control system of claim 30, wherein:

one of said one or more input devices is a manually controllable thrust command device; and one of said one or more output devices is a fuel control component which determines the amount of fuel is provided to each cylinder of an engine during each cycle of said engine.

32. For use with an electronic controller of a marine propulsion system of a marine vessel, a marine vessel communication system, comprising:

a communication bus connectable to said electronic controller to be in signal communication therewith;

one or more devices selected from the group consisting of a manually controlled steering device, a manually controlled thrust command mechanism, a speedometer, a tachometer, a steering actuator, and an engine controller, said one or more devices being connected in signal communication with said communication bus to allow said one or more devices and said electronic controller to communicate via said communication bus; and a bus access manager in signal communication with said electronic controller to regulate the incorporation of additional devices to said one or more devices in signal communication with said communication bus;.

33. The system of claim 32, wherein:

one of said one or more devices controls said marine propulsion system via said communication bus.

34. The system of claim 32, wherein:

said one or more devices comprises a steering transducer and a steering actuator, said steering transducer being connected to a manually actuated steering mechanism, said steering transducer providing a steering signal on said communication bus which is representative of a physical position of said manually actuated steering mechanism, said steering actuator being attached to said marine propulsion system for changing the position of said marine propulsion system relative to said marine vessel, said steering actuator receiving said steering signal from said communication bus.

35. The system of claim 32, wherein:

said one or more devices comprises a manually actuated thrust control mechanism and an engine controller which are both connected in signal communication with said communication bus, said engine controller controlling the fueling of an engine which is connected in torque transmitting relation with said marine propulsion system.

36. The system of claim 34, wherein:

said manually actuated thrust control mechanism is a manually movable throttle control lever.

37. The system of claim 32, wherein:

said one or more devices comprises a course controller, said course controller being connected in signal communication with said communication bus and having an input for receiving a manually entered destination position, said one or more devices further comprising a global positioning system which is connected in signal communication with said communication bus and having an input for receiving a signal which is representative of a current position of said marine vessel, said course controller being configured to determine a course from said current position to said destination position.

38. The system of claim 36, further comprising:

a chart plotter connected in signal communication with said communication bus.

39. The system of claim 32, wherein:

said one or more devices comprises a trim tab controller.

40. The system of claim 32, wherein:

said one or more devices comprises a manual docking system.

41. The system of claim 32, wherein:

one of said one or more devices receives a signal representing an operating characteristic of said marine propulsion system via said communication bus.

42. The system of claim 32, wherein:

said one or more devices comprises a plurality of gauges.

43. The system of claim 32, wherein:

said one or more devices comprises a collision avoidance system.

44. The system of claim 32, wherein:

said one or more devices comprises a manually actuated docking system.

45. The system of claim 32, wherein:

said one or more devices comprises a depth detector.

46. The system of claim 32, wherein:

said one or more devices comprises a liquid level sensor.

47. The system of claim 32, wherein:

said one or more devices comprises a drive trim controller for changing the trim angle of said marine propulsion system.

48. The system of claim 32, wherein:

said communication bus is a serial communication bus.

49. The system of claim 32, wherein:

said communication bus incorporates a controller area network.

50. The system of claim 32, wherein:

said one or more devices comprises a visible display showing a plurality of status conditions relating to said marine propulsion system and said marine vessel.

51. A marine vessel control system, comprising:

a marine propulsion system attached to said marine vessel;

a serial communication bus;

a controller connected in signal communication with said communication bus;

a plurality of devices connected in signal communication with said communication bus, whereby said controller is connected in signal communication with each of said plurality of devices on said communication bus, said plurality of devices comprising a steering transducer and a steering actuator, said steering transducer being connected to a manually actuated steering mechanism, said steering transducer providing a steering signal on said communication bus which is representative of a physical position of said manually actuated steering mechanism, said steering actuator being attached to said marine propulsion system for changing the position of said marine propulsion system relative to said marine vessel, said steering actuator receiving said steering signal from said communication bus, said plurality of devices comprising a manually actuated thrust control mechanism and an engine controller which are both connected in signal communication with said communication bus, said engine controller controlling the fueling of an engine which is connected in torque transmitting relation with said marine propulsion system, said manually actuated thrust control mechanism being a manually movable throttle control lever, said plurality of devices further comprising a course controller, said course controller being connected in signal communication with said communication bus and having an input for receiving a manually entered destination position, said plurality of devices further comprising a global positioning system which is connected in signal communication with said communication bus and having an input for receiving a signal which is representative of a current position of said marine vessel, said course controller being configured to determine a course from said current position to said destination position;

a bus access manager in signal communication with said controller to regulate the incorporation of additional devices to said plurality of devices in signal communication with said communication bus; and a chart plotter connected in signal communication with said communication bus.

* * * * *